US011965374B2

(12) United States Patent
Rodrigues et al.

(10) Patent No.: US 11,965,374 B2
(45) Date of Patent: Apr. 23, 2024

(54) ANTI-PINCHING WINDOW

(71) Applicant: Toyota Motor Engineering & Manufacturing North America, Inc., Plano, TX (US)

(72) Inventors: Sean P. Rodrigues, Ann Arbor, MI (US); Paul Donald Schmalenberg, Pittsburgh, PA (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 123 days.

(21) Appl. No.: 17/536,753

(22) Filed: Nov. 29, 2021

(65) Prior Publication Data

US 2023/0167667 A1 Jun. 1, 2023

(51) Int. Cl.
*E05F 15/695* (2015.01)
*E05F 15/43* (2015.01)
(Continued)

(52) U.S. Cl.
CPC .......... *E05F 15/695* (2015.01); *E05F 15/431* (2015.01); *E05F 15/71* (2015.01);
(Continued)

(58) Field of Classification Search
CPC .. H02P 6/00; H02P 6/005; H02P 6/006; H02P 6/04; H02P 6/06; H02P 6/08;
(Continued)

(56) References Cited

U.S. PATENT DOCUMENTS 5,399,854 A 3/1995 Dunphy et al.
5,953,469 A 9/1999 Zhou
(Continued)

FOREIGN PATENT DOCUMENTS

WO 19201554 A1 10/2019

OTHER PUBLICATIONS

Rodrigues et al. U.S. Appl. No. 17/343,824, filed Jun. 10, 2021.
(Continued)

*Primary Examiner* — Antony M Paul
(74) *Attorney, Agent, or Firm* — Christopher G. Darrow; Darrow Mustafa PC

(57) ABSTRACT

A window can be used to detect objects located within an opening. A structure can define the opening. The window can be operatively positioned within the opening. The window can be movable to selectively open and close the opening. The window can include an optical grating operatively positioned near a closing edge of the window. A light source configured to emit light toward the optical grating. A detector operatively positioned to acquire spectroscopic data of the light emitted from the light source after the light has interacted with the optical grating. A processor can be operatively connected to the detector. The processor can be configured to: determine a temperature based on the spectroscopic data; determine, based on the temperature, whether an object is located in the opening; and responsive to determining that an object is located in the opening, control a movement of window.

20 Claims, 13 Drawing Sheets

(51) Int. Cl.
*E05F 15/71* (2015.01)
*E05F 15/73* (2015.01)

(52) U.S. Cl.
CPC ........ *E05F 15/73* (2015.01); *E05F 2015/434* (2015.01); *E05Y 2900/55* (2013.01)

(58) Field of Classification Search
CPC ...... H02P 6/12; H02P 6/14; H02P 6/24; H02P 6/26; H02P 6/30; H02P 7/00; H02P 7/02; H02P 7/025; H02P 7/03; H02P 29/60; E05F 15/695
See application file for complete search history.

(56) References Cited

U.S. PATENT DOCUMENTS

| | | | |
|---|---|---|---|
| 7,542,635 | B2 | 6/2009 | Coleman |
| 8,290,315 | B2 | 10/2012 | Saunders et al. |
| 8,362,992 | B2 | 1/2013 | Kuhlman et al. |
| 8,964,298 | B2 | 2/2015 | Taddick et al. |
| 10,632,820 | B2 | 4/2020 | Cosgrove et al. |
| 11,320,588 | B1 | 5/2022 | Mazed |
| 11,327,305 | B2 | 5/2022 | Haussler |
| 2003/0076487 | A1 | 4/2003 | Cannon et al. |
| 2010/0159610 | A1 | 6/2010 | Sun et al. |
| 2010/0221461 | A1 | 9/2010 | Torr |
| 2010/0247027 | A1 | 9/2010 | Xia et al. |
| 2013/0127980 | A1 | 5/2013 | Haddick et al. |
| 2014/0019005 | A1 | 1/2014 | Lee et al. |
| 2016/0311323 | A1 | 10/2016 | Lee et al. |
| 2018/0268701 | A1 | 9/2018 | Sato et al. |
| 2018/0334101 | A1 | 11/2018 | Tschirhart |
| 2018/0372554 | A1 | 12/2018 | Laycock |
| 2019/0248122 | A1 | 8/2019 | Gillessen et al. |
| 2019/0315275 | A1 | 10/2019 | Kim et al. |
| 2019/0356508 | A1 | 11/2019 | Trikha et al. |
| 2019/0383672 | A1 | 12/2019 | Liu et al. |
| 2020/0249111 | A1 | 8/2020 | Doyle et al. |
| 2021/0033857 | A1 | 2/2021 | Waldern et al. |
| 2021/0165215 | A1 | 6/2021 | Haussler |
| 2021/0181405 | A1 | 6/2021 | Nichol et al. |
| 2021/0341314 | A1* | 11/2021 | Desmarchelier ... G02B 6/02395 |
| 2021/0389615 | A1 | 12/2021 | Rodrigues |
| 2021/0394793 | A1 | 12/2021 | Austin et al. |
| 2022/0179148 | A1 | 6/2022 | Coleman et al. |
| 2022/0187521 | A1 | 6/2022 | Toy et al. |
| 2022/0283377 | A1 | 9/2022 | Popovich et al. |
| 2022/0283432 | A1 | 9/2022 | Richards |
| 2022/0310893 | A1 | 9/2022 | Frei et al. |
| 2022/0382224 | A1 | 12/2022 | Shrivastava et al. |

OTHER PUBLICATIONS

Rodrigues et al. U.S. Appl. No. 17/536,821, filed Nov. 29, 2021.
Moynihan, T.,"What Are Quantum Dots, and Why Do I Want Them in My TV?", Wired, Jan. 19, 2015, retrieved from the Internet: <https://www.wired.com/2015/01/primer-quantum-dot/>, [retrieved Nov. 18, 2021] (10 pages).
Zhou, X. et al. "Full color waveguide liquid crystal display", Optics Letters, vol. 42, Issue 18, Sep. 15, 2017 (4 pages).
Klimov, N. et al., "On-Clip Silicon Waveguide Bragg Grating Photonic Temperature Sensor", Optics Letters, vol. 40, Issue 17, 2015 (4 pages).
Li, "Understanding Waveguide: the Key Technology for Augmented Reality Near-eye Display (Part I)", Virtual Reality Pop, Jun. 18, 2019, Retrieved from the Internet: <https://virtualrealitypop.com/understanding-waveguide-the-key-technology-for-augmented-reality-near-eye-display-part-i-2b16b61f4bae>, [retrieved Apr. 29, 2020] (10 pages).
U.S. Appl. No. 16/897,577.

* cited by examiner

ANTI-PINCHING WINDOW

FIELD

The subject matter described herein relates in general to windows and, more particularly, to windows that can be opened and closed.

BACKGROUND

A vehicle can include a number of windows, including windshields, side windows, and a rear window. Some side windows can be raised and lowered. In some instances, some side windows can be raised and lowered manually by a hand crank. In other instances, some side windows can be powered windows, which can be automatically raised and lowered based on a user input provided on a user interface element in the vehicle.

SUMMARY

In one respect, the subject matter presented herein is directed to a system. The system can include a structure defining an opening. The system can include a window operatively positioned within the opening. The window can be movable to selectively open and close the opening. The window can include an optical grating operatively positioned near a closing edge of the window. The system can include a light source configured to emit light toward the optical grating. The system can include a detector operatively positioned to acquire spectroscopic data of the light emitted from the light source after the light has interacted with the optical grating. The system can include a processor operatively connected to the detector. The processor can be configured to determine a temperature based on the spectroscopic data. The processor can be configured to determine, based on the temperature, whether an object is located in the opening. The processor can be configured to, responsive to determining that an object is located in the opening, control a movement of window.

In another respect, the subject matter presented herein is directed to a method. A structure can define an opening. A window can be operatively positioned within the opening. The window can be movable to selectively open and close the opening. The window can include an optical grating operatively positioned near a closing edge of the window. A light source can be configured to emit light toward the optical grating. A detector can be operatively positioned to acquire spectroscopic data of the light emitted from the light source after the light has interacted with the optical grating. The method can include determining a temperature based on the spectroscopic data. The method can include determining, based on the temperature, whether an object is located in the opening. The method can include, responsive to determining that an object is located in the opening, controlling a movement of window.

DETAILED DESCRIPTION

Figure 1:
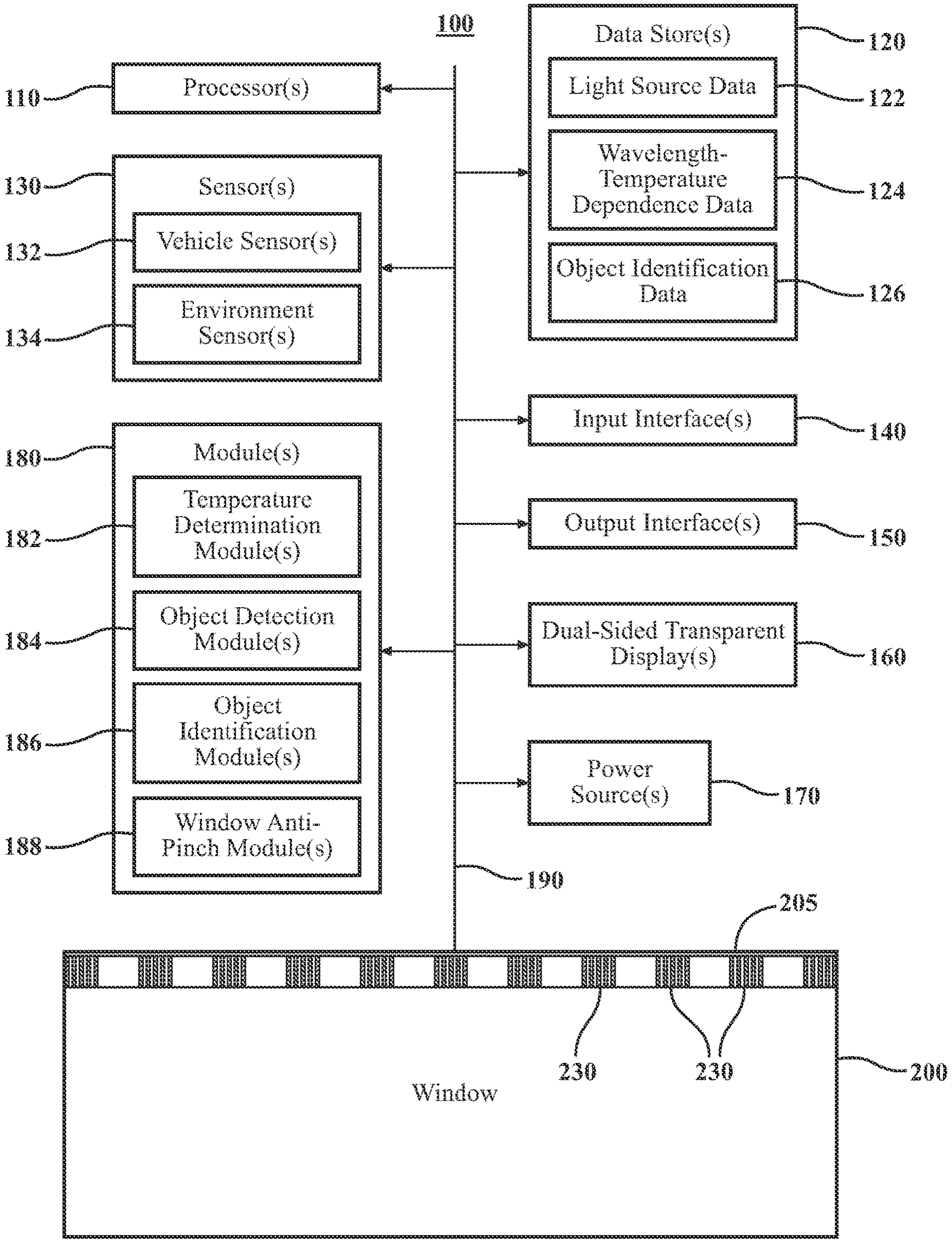
FIG. 1 is anti-pinch window system.

When a window can be opened and closed, there can be a danger of closing the window on a person, animal, or object that extends into the open window. When closing a window, the window may impinge upon any object located within the window opening. Thus, there is an increased risk of damage or injury to an object located within the window opening, the window itself, or the overall structure that the window is a part of (e.g., a vehicle).

Accordingly, arrangements described herein are directed to anti-pinch window systems and methods. A window can be configured to include an optical grating operatively positioned near a closing edge of the window. A light source can be configured to emit light toward the optical grating, and a detector can be operatively positioned to acquire spectroscopic data of the light emitted from the light source after the light has interacted with the optical grating. "Spectroscopic data" can include transmitted wavelength(s) and/or reflected wavelength(s) of the light emitted from the light source after the light has interacted with the optical grating. "Spectroscopic data" can include intensity per wavelength data.

It should be noted that the optical grating can have an associated coefficient of thermal expansion. Thus, local changes in temperature by, on, at, near, or around the optical grating can cause the optical grating to thermally expand or contract. Such thermal expansion or contraction can cause a change in the spectroscopic data of the light after the light has interacted with the optical grating.

The acquired spectroscopic data can be used to determine temperature, which, in turn, can be used to determine whether an object is located in the opening. Movement of the window can be controlled in response to determining that an object is located in the opening. As a result, window closure upon an object located within the window opening can be avoided.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details.

FIG. 1 is an example of an anti-pinch window system 100. Some of the possible elements of the anti-pinch window system 100 are shown in FIG. 1 and will now be described. It will be understood that it is not necessary for the anti-pinch window system 100 to have all of the elements shown in FIG. 1 or described herein. The anti-pinch window system 100 can include one or more processors 110, one or more data stores 120, one or more sensors 130, one or more input interfaces 140, one or more output interface(s) 150, one or more dual-sided transparent displays 160, one or more power source(s) 170, one or more modules 180, and one or more windows 200.

The various elements of the anti-pinch window system 100 can be communicatively linked through one or more communication networks 190. As used herein, the term "communicatively linked" can include direct or indirect connections through a communication channel or pathway or another component or system. A "communication network" means one or more components designed to transmit and/or receive information from one source to another. The communication network(s) 190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 190 further can be implemented as or include one or more wireless networks, whether short or long range. For example, in terms of short range wireless networks, the communication network(s) 190 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 190 can include a mobile, cellular, and or satellite-based wireless network and support voice, video, text, and/or any combination thereof. Examples of long range wireless networks can include GSM, TDMA, CDMA, WCDMA networks or the like. The communication network(s) 190 can include wired communication links and/or wireless communication links. The communication network(s) 190 can include any combination of the above networks and/or other types of networks. The communication network(s) 190 can include one or more routers, switches, access points, wireless access points, and/or the like. In one or more arrangements, the communication network(s) 190 can include Vehicle-to-Vehicle (V2V), Vehicle-to-Infrastructure (V2I), Vehicle-to-Cloud (V2C), or Vehicle-to-Everything (V2X) technology.

One or more elements of the anti-pinch window system 100 include and/or can execute suitable communication software, which enables two or more of the elements to communicate with each other through the communication network(s) 190 and perform the functions disclosed herein.

As noted above, the anti-pinch window system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The anti-pinch window system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In some arrangements, the data store(s) 120 can include light source data 122. The light source data 122 can include characteristics of light as it is emitted by light source(s) 240 of the window 200, as will be described below in connection with FIGS. 2A and 2B. As an example, the characteristics can include the wavelength(s) of the emitted light.

In some arrangements, the data store(s) 120 can include wavelength-temperature dependence data 124, particularly with respect to optical grating(s) of the window 200. Wavelength can be directly related the temperature. This relationship is shown in the wavelength-temperature dependence graph 300 of FIG. 3, which shows a sample of wavelength-temperature dependence data 124. The temperature of the optical grating(s) of the window(s) 200 can change. As a result, the optical grating(s) can undergo thermal expansion or thermal contraction, which, in turn, can cause a change in the spectroscopic data of the light that has interacted with the optical grating(s).

In some arrangements, the data store(s) 120 can include object identification data 126. The object identification data 126 can be any data that can be used to detect and/or identify an object according to arrangements described herein. In some arrangements, the object identification data 126 can include information or data about one or more objects. The object identification data 126 can include information or data about objects that may commonly be extended into an open window, such as various portions of a human body (e.g., fingers, hands, arms, legs, feet, head, etc.), various portions of an animal's body (e.g., a head of a dog), other living objects, and/or non-living objects. The object identification data 126 can include temperature ranges, minimum temperatures, and/or temperature threshold(s) associated with each object. As an example, a human arm can show a temperature within a certain range. In some arrangements, the object identification data 126 can include size, shape, measurements, dimensions, or other information of data about one or more objects. As an example, the object identification data 126 can include an average size or a range of sizes of one or more parts of a human body. For instance, a human arm or human fingers can have an average width. In some arrangements, the object identification data 126 can include temperature patterns for each object as detected at the window(s) 200 described herein. As an example, human fingers can have a temperature pattern of several separate elevated temperature areas.

The anti-pinch window system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the anti-pinch window system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 132. The vehicle sensor(s) 132 can detect, determine, assess, monitor, measure, quantify and/or sense information about a vehicle itself (e.g., position, orientation, speed, etc.). The sensor(s) 130 can include one or more environment sensors 134 configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensor(s) 134 can include one or more radar sensors, one or more lidar sensors, one or more sonar sensors, and/or one or more cameras.

The anti-pinch window system 100 can include one or more input interfaces 140. An "input interface" includes any device, component, system, element or arrangement or groups thereof that enable information/data to be entered into a machine. The input interface(s) 140 can receive an input from a user (e.g., a person) or other entity. Any suitable input interface(s) 140 can be used, including, for example, a keypad, display, touch screen, multi-touch screen, button, dial, joystick, mouse, trackball, microphone, gesture recognition (radar, lidar, camera, or ultrasound-based), stereo dial and/or combinations thereof.

The anti-pinch window system 100 can include one or more output interfaces 150. An "output interface" includes any device, component, system, element or arrangement or groups thereof that enable information/data to be presented to a user (e.g., a person) or other entity. The output interface(s) 150 can present information/data to a user or other entity. The output interface(s) 150 can include a display, an earphone, a haptic device, a projector, and/or speaker. Some components of the anti-pinch window system 100 may serve as both a component of the input interface(s) 140 and a component of the output interface(s) 150.

The anti-pinch window system 100 can include one or more dual-sided transparent display 160. The dual-sided transparent display(s) 160 can be configured to display first visual information on a first side of the display and to display second visual information on a second side of the display. The first visual information and the second visual information can be displayed simultaneously. In some arrangements, the first visual information is not visible on the second side of the display. Similarly, in some arrangements, the second visual information is not visible on the first side of the display. Various different embodiments of the dual-sided transparent display(s) 160 will be described further below with reference to FIGS. 8-11.

In some arrangements, the dual-sided transparent display(s) 160 can be included in the window 200. In some arrangements, at least a portion of the window 200 can include the dual-sided transparent display(s) 160. In other arrangements, the entire window 200 can be the dual-sided transparent display(s) 160. The dual-sided transparent display(s) 160 can be part of the input interface(s) 140 and/or the output interface(s) 150 of the anti-pinch window system 100. The dual-sided transparent display(s) 160 can be configured to display information, data, images, and/or video to a person near the window 200.

The anti-pinch window system 100 can include one or more power source(s) 170, as noted above. The power source(s) 170 can be any power source capable of and/or configured to power the anti-pinch window system 100 and/or one or more elements thereof. For example, the power source(s) 170 can include one or more alternating current or direct current sources such as one or more batteries, one or more fuel cells, one or more generators, one or more alternators, one or more solar cells, and combinations thereof.

Figure 2A:
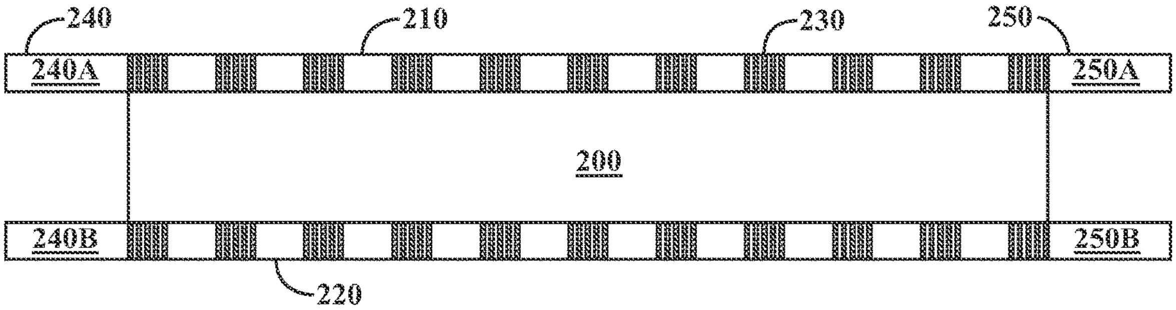
FIG. 2A is a first example of a window.
Figure 2B:
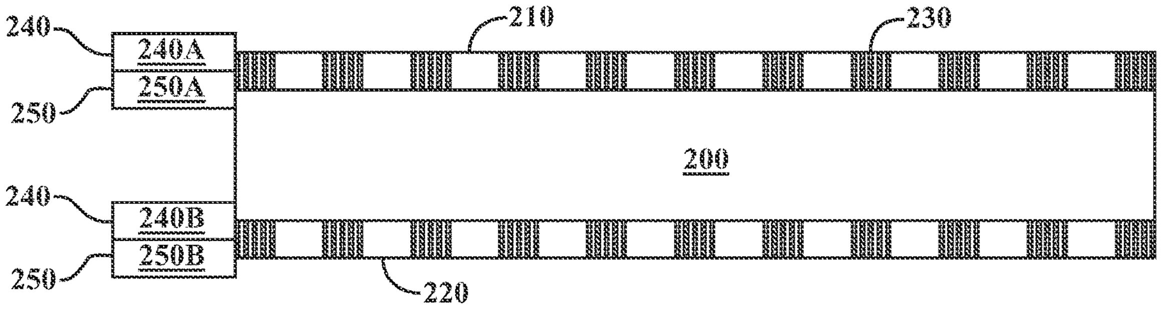
FIG. 2B is a second example of a window.

As noted above, the anti-pinch window system 100 can include a window 200. Referring to FIGS. 2A and 2B, some examples of the window 200 are shown. The window 200 can include a first side 210 and a second side 220. The second side 220 can be substantially parallel to the first side 210. The first side 210 and/or the second side 220 can include a surface of the window 200, for example, a surface of a glass pane. Alternatively, the first side 210 and/or the second side 220 can be separate window components, for example, separate glass panes. In such arrangements, the panes can be separated by a noble gas (e.g. argon or krypton) compartment (or layer) with an appropriate edge seal to the panes. The window 200 can be made of any suitable material, now known or later developed. The window 200 can have any suitable size, shape, and/or configuration. The window 200 can include one or more layers.

The window 200 can include one or more optical gratings 230. The optical grating(s) 230 can be operatively positioned with respect to the first side 210 and/or the second side 220. As shown in FIGS. 2A and 2B, the window 200 includes a plurality of optical gratings 230 operatively positioned with respect to both the first side 12 and the second side 14. As used herein, the term "operatively positioned" means on, in, or under the respective surface of the window such that a temperature of the environment on that side of the window can affect the thermal expansion or contraction of the optical grating. As a result, the spectroscopic characteristics of light interacting with the optical grating can be affected.

There can be any suitable quantity of optical gratings 230. In some instances, the quantity of the optical grating(s) 230 on the first side 210 can be the same as the quantity of the optical grating(s) 230 on the second side 220. In other instances, the quantity of the optical grating(s) 230 on the first side 210 can be different than the quantity of the optical grating(s) 230 on the second side 220. In some arrangements, the size, arrangement, and distribution of the optical grating(s) 230 on the first side 210 can be the same as the size, arrangement, and distribution of the optical grating(s) 230 on the second side 220. In some arrangements, the size, arrangement, and/or distribution of the optical grating(s) 230 on the first side 210 can be different from the size, arrangement, and/or distribution of the optical grating(s) 230 on the second side 220. In some arrangements, the optical grating(s) 230 on the first side 210 can be substantially aligned with the optical grating(s) 230 on the second side 220. In some arrangements, the optical grating(s) 230 on the first side 210 may not be aligned with the optical grating(s) 230 on the second side 220 such that they do not overlap in a direction that passes through and is substantially perpendicular to the first side 210 and the second side 220.

The optical grating(s) 230 can be configured to interact with light. The optical grating(s) 230 can have an associated thermal expansion coefficient. Thus, the optical grating(s) 230 can thermally expand or contract based on the temperatures by, on, at, near, or around the optical grating(s) 230. For example, the ambient temperature of the environment can cause thermal expansion or contraction of the optical grating(s) 230. As another example, the presence of a thermal body (e.g., a portion of a human body) near the optical grating(s) 230 can cause thermal expansion or contraction of the optical grating(s) 230. The thermal expansion or contraction of the optical grating(s) 230 can affect the spectroscopic data (e.g., reflected wavelength and/or transmitted wavelength) of the light after the light has interacted with the optical grating(s) 230. In some arrangements, the optical grating(s) 230 can be configured to filter or remove one or more wavelengths of the light. The optical grating(s) 230 can be any suitable type of optical grating with a thermal expansion coefficient.

For example, the optical grating(s) 230 can also be configured as a notch band reject grating or a notch band pass grating. The notch band reject grating (e.g., notch filter) can be configured to reflect or filter a small segment of light (e.g., one wavelength or a subset of wavelengths) while allowing the remaining light to pass through the grating. The notch band pass grating (e.g., notch pass) can be configured to allow a small segment of light (e.g., one wavelength or a subset of wavelengths) to pass through the grating while reflecting or filtering the remaining light.

The optical grating(s) 230 can be any suitable form of optical grating(s). For example, one or more of the optical grating(s) 230 can be an optical fiber grating, an optical splitter, a Bragg grating, a fiber Bragg grating, a diffraction grating, a fiber optic wavelength decoder, a ruled grating, a holographic grating, and/or any other optical component with a periodic structure that can diffract or split light energy into one or more its constituent wavelengths such that at least some of these wavelengths are directed at a different angle. In some arrangements, the optical grating(s) 230 can be applied with a light sensitive characteristic of fiber core layer material so that a refractive index on the grating changes where the wavelength and temperature of the optical grating have excellent linear relationships.

The optical grating(s) 230 can be formed on a surface of the window 200, coated on a surface of the window 200, or otherwise formed or integrated into the window 200, for example, below a surface of the window 200. In some arrangements, the optical grating(s) 230 can be formed in the window 200 by depositing, etching, or cutting gratings onto a surface of the window 200. In other arrangements, the optical grating(s) 230 can be coated on the window 200 by applying grating(s) to a surface of the window 200.

In addition to the optical grating(s) 230, the window 200 can include one or more light sources 240, as noted above. The light source(s) 240 can be operatively positioned with respect to the first side 210 and/or the second side 220. As shown in FIGS. 2A and 2B, the window 200 includes a first light source 240A operatively positioned with respect to the first side 210 and a second light source 240B operatively positioned with respect to the second side 220. In these and other arrangements, the light source(s) 240 can be configured to emit light toward the optical grating(s) 230 such that the light interacts with the optical grating(s) 230. The light source(s) 240 can be configured to emit any suitable type of light. For example, the light source(s) 240 can emit polychromatic, visible light, infrared light, or a set of laser diodes with a full-width half max greater than 5 nanometers. In some arrangements, the light source(s) 240 can be wideband light source transmitters.

In addition to the light source(s) 240, the window 200 can include one or more detectors 250, as noted above. The detector(s) 250 can be operatively positioned to detect one or more properties of the light after the light has interacted with the optical grating(s) 230. For example, the detector(s) 250 can be configured to detect one or more wavelengths of the light after the light has interacted with the optical grating(s) 16. The detector(s) 250 can be any suitable type of detector(s). For example, the detector(s) 250 can be spectrometer(s) or detector(s) having multiple spectral filters. In some arrangements, the detector(s) 250 can operate in the infrared section of the electromagnetic spectrum.

In the arrangements shown in FIG. 2A, the detector(s) 250 can be positioned on the opposite side of the optical grating(s) 230 from the light source(s) 240. In these arrangements, the detector(s) 250 can be operatively positioned and configured to detect spectroscopic data (e.g., transmitted wavelength(s)) of the light after the light has passed through the optical gratings. Also shown, the detector(s) 250 can include a first detector 250A operatively positioned with respect to the first side 210 on the opposite side of the optical grating(s) 230 from the first light source 240A. The first detector 250A can detect spectroscopic data (e.g., transmitted wavelength(s)) of the light emitted by the first light source 240A after it has passed through the optical grating(s) 230 on the first side 210 of the window 200. Similarly, the detector(s) 250 can also include a second detector 250B operatively positioned with respect to the second side 220 on the opposite side of the optical grating(s) from the second light source 240B. The second detector 250B can detect spectroscopic data (e.g., transmitted wavelength(s)) of the light emitted by the second light source 240B after it has passed through the optical grating(s) 230 on the second side 220. In some arrangements, the first detector 250A can be substantially aligned with the first light source 240A and/or the second detector 250B can be substantially aligned with the second light source 240B.

In the arrangements) shown in FIG. 2B, the detector(s) 250 can be positioned on the same side of the optical grating(s) 230 as the light source(s) 240. In these arrangements, the detector(s) 250 can be operatively positioned and configured to detect spectroscopic data (e.g., reflected wavelength(s)) of the light after the light has been reflected by the optical grating(s) 230. In these arrangements, the detector(s) 20 can include a first detector 250A operatively positioned with respect to the first side 210 on the same side of the optical grating(s) 230 as the first light source 240A. The first detector 250A can detect spectroscopic data (e.g., reflected wavelength(s)) of the light emitted by the first light source 240A after it has been reflected by the optical grating(s) 230 on the first side 210 of the window 200. Similarly, the detector(s) 250 can also include a second detector 250B operatively positioned with respect to the second side 220 on the same side of the optical grating(s) as the second light source 240B. The second detector 250B can detect spectroscopic data (e.g., reflected wavelength(s)) of the light emitted by the second light source 240B after it has been reflected by the optical grating(s) 230 on the second side 220. In some arrangements, the first detector 250A can be substantially adjacent to the first light source 240A and/or the second detector 250B can be substantially adjacent to the second light source 240B.

There can be various arrangements of the optical grating(s) 230, the light source(s) 240 and the detector(s) 250. Some of these arrangements are shown in connection with FIGS. 12A-12D. It should be noted that, in these examples, the terms "input signal" and "output signal" are used for convenience to facilitate the discussion and are used relative to the signal before and after interacting with the optical grating(s) 230, respectively.

Figure 12A:
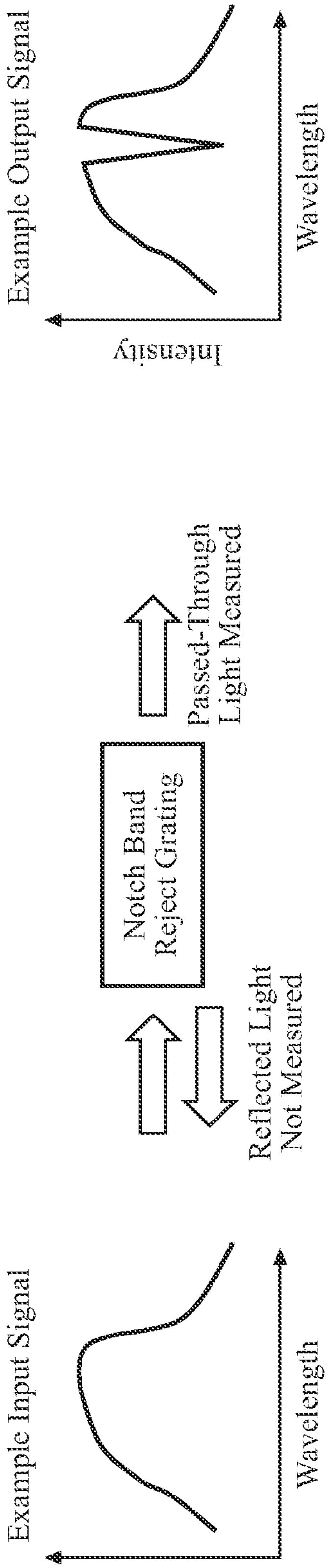
FIG. 12A is an example of an arrangement of a notch band reject grating, a light source, and a detector.

As shown in FIG. 12A, the optical grating(s) 230 can be notch band reject grating(s). The light source(s) 240 can emit an example input signal (e.g., emit light toward the notch band reject grating(s)). The notch band reject grating(s) can be configured to reflect one or a small subset of wavelengths of light and allow the remaining wavelengths to pass through the grating(s). In this example, the detector(s) 250 can be positioned on the opposite side of the grating(s) from the light source(s) 240. The detector(s) 250 can be configured to capture an output signal (light that has passed through the grating(s)). As shown in FIG. 12A, the example output signal can generally have the same shape as the example input signal, but a segment of the signal is missing, which is evident by the v-shaped dip in the example output signal. In these arrangements, the reflected light may not be measured.

Figure 12B:
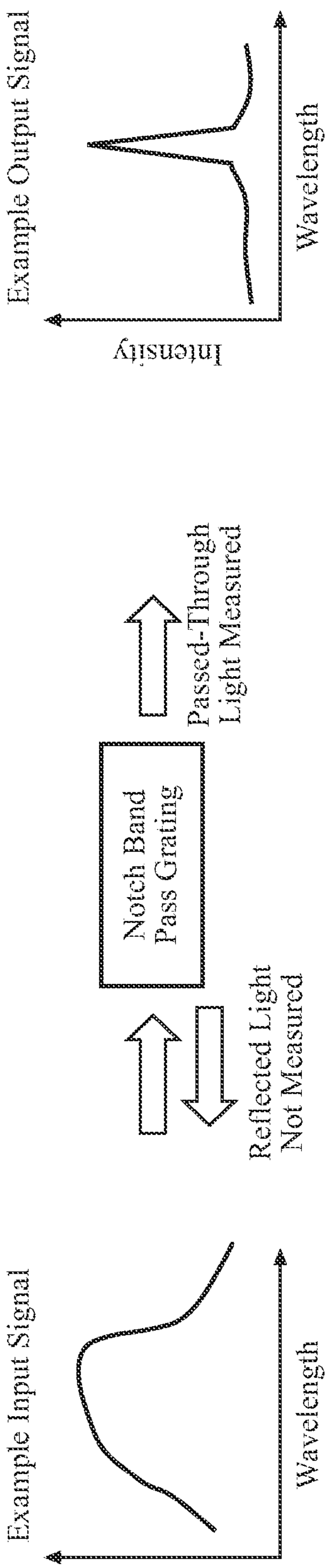
FIG. 12B is an example of an arrangement of a notch band pass grating, a light source, and a detector.

Referring to FIG. 12B, the optical grating(s) 230 can be notch band pass grating(s). The light source(s) 240 can emit an example input signal (e.g., emit light toward the notch band pass grating(s)). The notch band pass grating(s) can be configured to allow only one or a small subset of wavelengths of light to pass through the grating(s) and reflect the remaining wavelengths. The detector(s) 250 can be positioned on the opposite side of the grating(s) from the light source(s) 240. The detector(s) 250 can be configured to capture an output signal (light that has passed-through the grating(s)). As shown in FIG. 12B, only the small segment of light that was allowed to pass appears in the example output signal, which is evident by the spike in the example output signal. In these arrangements, the reflected light may not be measured.

Figure 12C:
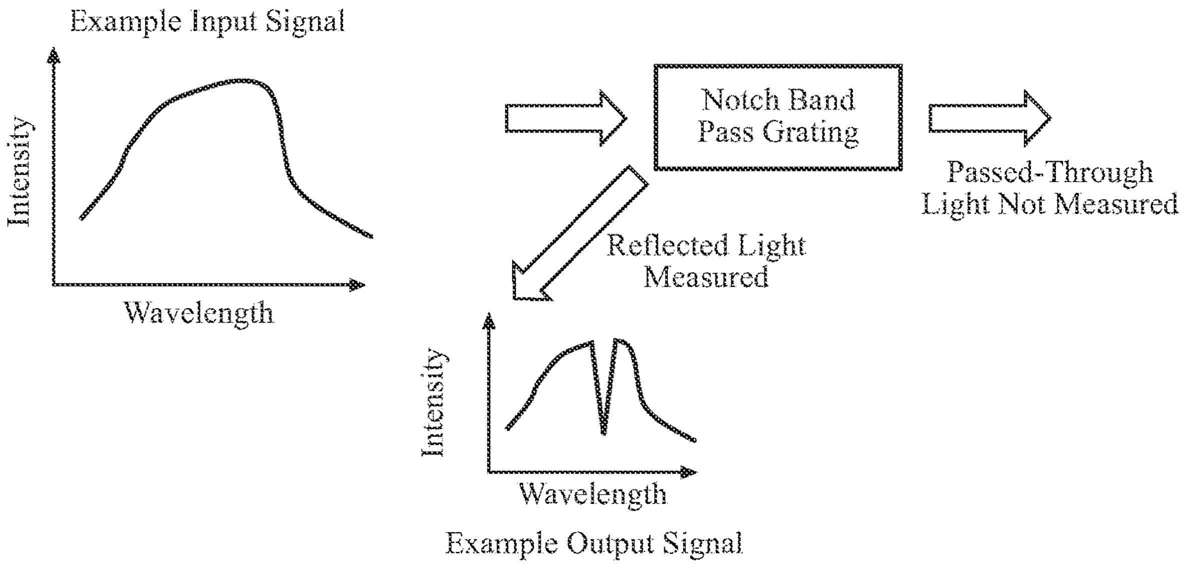
FIG. 12C is an example of an arrangement of a notch band reject grating, a light source, and a detector.

As shown in FIG. 12C, the optical grating(s) 230 can be notch band pass grating(s). The light source(s) 240 can emit an example input signal (e.g., emit light toward the notch band pass grating(s)). The notch band pass grating(s) can be configured to allow one or a small subset of wavelengths of light to pass through the grating(s) while reflecting the remaining wavelengths of the input signal. The detector(s) 250 can be positioned on the same side of the grating(s) as the light source(s) 240. The detector(s) 250 can be configured to capture an output signal (light reflected by the grating(s)). As shown in FIG. 12C, the example output signal can generally have the same shape as the example input signal, but a small segment of the signal is missing, which is evident by the v-shaped dip in the example output signal. In these arrangements, the passed-through light may not be measured.

Figure 12D:
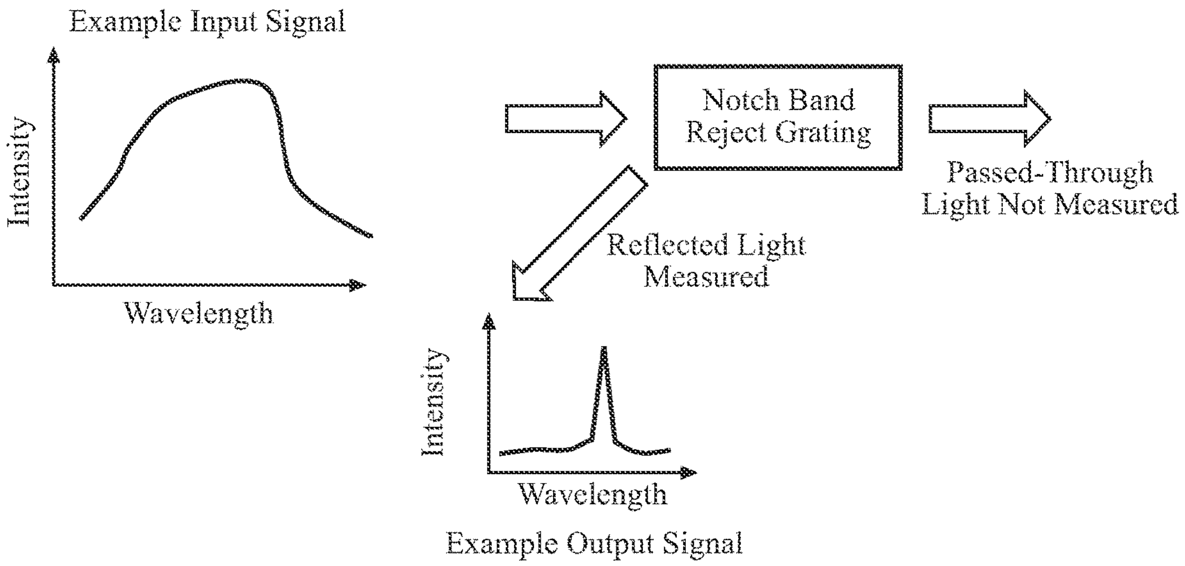
FIG. 12D is an example of an arrangement of a notch band pass grating, a light source, and a detector.

Referring to FIG. 12D, the optical grating(s) 230 can be notch band reject grating(s). The light source(s) 240 can emit an example input signal (e.g., emit light toward the notch band reject grating(s)). The notch band reject grating(s) can be configured to reflect one or a small subset of wavelengths of light and allow the remaining wavelengths to pass through the grating(s). The detector(s) 250 can be positioned on the same side of the grating(s) as the light source(s) 240. The detector(s) 250 can be configured to capture an output signal (light reflected by the grating(s)). As shown in FIG. 12D, only the small segment of light that was reflected appears in the example output signal, which is evident by the spike in the example output signal. In these arrangements, the passed-through light may not be measured.

The optical grating(s) 230 can be used to determine a temperature at or near the first side 210 and/or the second side 220 through detection of the spectroscopic data (e.g., transmitted and/or reflected wavelength(s))) of light after it has interacted with the optical grating(s) 230. As used in this respect, the term "near" can mean being within a distance from the surface of the window, such as about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, about 1 inch or less, about 0.75 inches or less, about 0.5 inches or less, or about 0.25 or less. In order to determine the temperature, the anti-pinch window system 100 can compare information about the light emitted by the light source(s) 240 and/or the spectroscopic data detected by the detector(s) 250 to the wavelength-temperature dependence data 124, as will be discussed further below with reference to FIG. 3.

The anti-pinch window system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, the data store(s) 120 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The anti-pinch window system 100 can include one or more temperature determination modules 182. The temperature determination module(s) 182 can be configured to determine the temperature at or near the first side 210 and/or the second side 220 of the window 200. The temperature determination module 182 can be configured to determine the temperature in any suitable manner.

For example, by using the light source data 122 and/or by detecting the spectroscopic data of the light after it has interacted with the optical grating(s) 230, the temperature determination module 182 can be configured to determine a change in the characteristics of the light by comparing the original light signal from the light source(s) 240 to the acquired spectroscopic data of the light after it has interacted with the optical grating(s) 230. The change in the wavelength(s) from the original light signal to the acquired spectroscopic data may correspond to the temperature at or near the optical grating(s) 230. As the temperature changes, the transmissive wavelength spectra changes. In some arrangements, an increase in the wavelength(s) may correspond to an increase in the temperature on, at, or near the surface of the window 200 (e.g., at or near the optical grating(s) 230). Similarly, a decrease in the wavelength(s) may correspond to a decrease in the temperature on, at, or near the surface of the window 200 (e.g., at or near the optical grating(s) 230). The light source data 122 can also be used to calibrate one or more components of the anti-pinch window system 100, for example, the detector(s) 250.

In some arrangements, the temperature determination module(s) 182 can be configured to analyze data and/or information acquired by the detector(s) 250. For example, the temperature determination module(s) 182 can receive the spectroscopic data (e.g., transmitted or reflected wavelength(s)) of the light after it has interacted with the optical grating(s) 230. The temperature determination module(s) 182 can compare the detected spectroscopic data to the wavelength-temperature dependence data 124 and/or the light source data 122. In some arrangements, the detector(s) 250 can detect a specific wavelength of light or a set of wavelengths of light after it has passed through the optical grating(s). In other arrangements, the detector(s) 250 can detect a specific wavelength of light or a set of wavelengths of light reflected by the optical grating(s). In some arrangements, the specific wavelength of light or the set of wavelengths of light can correlate to a peak in the transmissive spectra of the light.

Figure 3:
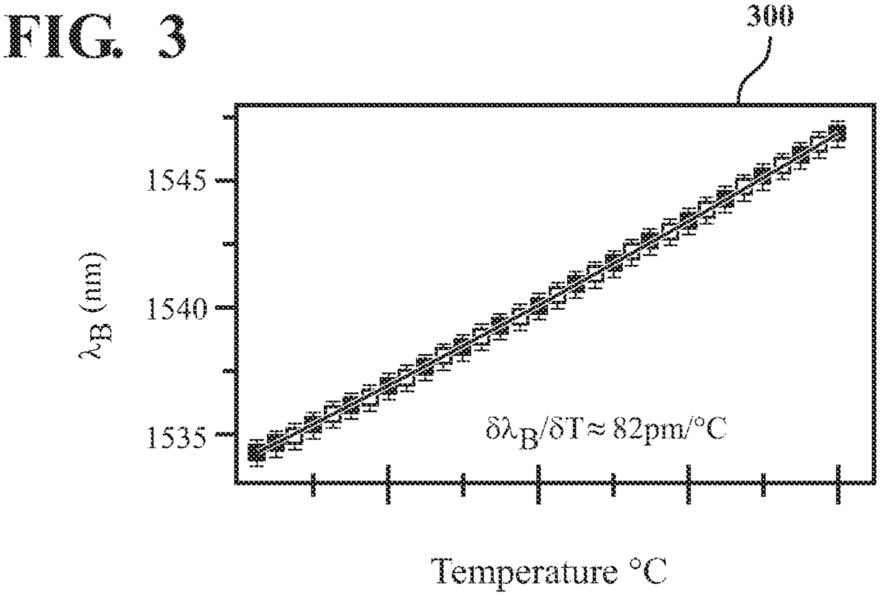
FIG. 3 is an example of a Bragg wavelength-temperature graph.

With reference now to FIG. 3, a detected peak can be directly related the temperature at or near the optical grating(s) 230. This relationship is shown in the wavelength-temperature dependence graph 300 of FIG. 3, which shows a sample of wavelength-temperature dependence data 124. As indicated in the wavelength-temperature dependence data 124, the transmitted/reflected wavelength(s) can change based on the thermal expansion or thermal contraction of the optical grating(s) 230. The optical grating(s) 230 can expand or contract due to changes in temperature. Through detection of the peak, the temperature at or near the optical grating(s) 230 may be determined using this graph by comparing the wavelength(s) at the peak to the wavelength-temperature dependence data 124.

In some arrangements, the temperature determination module(s) 182 can be configured to analyze changes in one or more characteristics of the light after it has interacted with the optical grating(s) 230 in order to determine the temperature. In some arrangements, the anti-pinch window system 100 can include light source data 122, which includes characteristics of the light as it is emitted by the light source(s) 240, such as the wavelength(s) of the emitted light. Using the light source data 122, and by detecting the spectroscopic data (e.g., wavelength(s)) of the light after it has interacted with the optical grating(s) 230, the temperature determination module(s) 182 can be configured to determine a change in the wavelength of the light. The change in the wavelength(s) may correspond to the temperature at or near the optical grating(s) 230. As the temperature changes, the transmissive wavelength spectra changes. In some arrangements, an increase in the wavelength(s) may correspond to an increase in the temperature at or near the surface of the window 200. Similarly, a decrease in the wavelength(s) may correspond to a decrease in the temperature at or near the surface of the window 200. The light source data 122 can also be used to calibrate one or more components of the anti-pinch window system 100, for example, the detector(s) 250.

In some arrangements, the light source data 122 can be determined in real-time. Thus, in addition to emitting light at the optical grating(s) 230, the light source(s) 240 can emit light directly at the detector(s) 250. In this case, the detector(s) 250 can determine the optical characteristics of the light without interacting with the optical grating(s) 230. In this way, the light can serve as a reference signal. The temperature determination module(s) 182 can be configured to analyze the differences between the reference signal and the characteristics of the light after it has interacted with the optical grating(s) 230. For example, the temperature determination module(s) 182 can be configured to identify changes in wavelength(s) between the reference signal and the characteristics of the light (e.g., spectroscopic data) after it has interacted with the optical grating(s) 230. As another example, the temperature determination module(s) 182 can be configured to identify the absence of one or more wavelengths in the light after it has interacted with the optical grating(s) 230 relative to the reference signal.

Moreover, in some arrangements, when the broadband light from the light source(s) 240 is emitted toward the optical grating(s) 230, the optical grating(s) 230 may carry out selective reflection of the light and then reflect a central wavelength and core refractive rate phase modulation that matches a narrow band of light. Therefore, the wavelength-temperature dependence data 124 can be used to determine the corresponding temperature.

The anti-pinch window system 100 can include one or more object detection modules 184. The object detection module(s) 184 can be configured to determine whether an object is located in a window opening. The object detection module(s) 184 can be configured to do so in any suitable manner.

For instance, the object detection module(s) 184 can be configured to compare the temperature(s), as determined by the temperature determination module(s) 182, to the object identification data 126, which can include temperature ranges or thresholds for objects (such as parts of a human body). If the determined temperature(s) fall within a range or meet a threshold, then it can be determined that an object is located in the window opening.

In some arrangements, the object detection module(s) 184 can be configured to compare the temperature(s), as determined by the temperature determination module(s) 182, to an ambient temperature or an expected temperature. When the determined temperature(s) differ from the ambient temperature or the expected temperature, then an object can be determined to be located in the opening.

In some arrangements, the object detection module(s) 184 can be configured to compare a determined temperature at an optical grating 230 on a first side of the window 200 (i.e., a first temperature) to a determined temperature at an optical grating 230 on the second side 220 of the window 200 (i.e., a second temperature). The object detection module(s) 184 can be configured to compare the first temperature and/or the second temperature to an ambient temperature or an expected temperature. When the first temperature and the second differ from the ambient temperature or the expected temperature, then an object can be determined to be located in the window opening. In some arrangements, the comparing of the first temperature and the second to an ambient temperature or an expected temperature can be performed when the first temperature and the second temperature are substantially the same, which can be indicative that the same object is extending through the window opening (as opposed to two different objects on opposite sides of the window opening).

In some arrangements, the object detection module(s) 184 can be configured to determine a size of an object based on a plurality of temperatures. The determined sized can be compared to sizes included in the object identification data 126 to determine whether an object is located in the window opening. For instance, a plurality of the optical gratings 230 that are sequentially arranged in a row may indicate substantially the same elevated temperature. The distance across these optical gratings 230 can be assumed to the width of an object. This width can be compared to the object identification data 126.

The anti-pinch window system 100 can include one or more object identification modules 186. The object identification module(s) 186 can be configured to identify an object that is located in a window opening. The object identification module(s) 186 can be configured to identify the exact object, general nature of the object (e.g., portion of a human body), class of the object (e.g., living v. non-living). The object identification module(s) 186 can be configured to do so in any suitable manner.

The object identification module(s) 186 can analyze temperatures determined by the temperature determination module(s) 182 to detect, identify, and/or classify an object. The object identification module(s) 186 can use any suitable technique, including, for example, template matching and other kinds of computer vision and/or image processing techniques and/or other artificial or computational intelligence algorithms or machine learning methods. The object identification module(s) 186 can include any suitable object recognition software. The object identification module(s) 186 can query the object identification data 126 for possible matches. For instance, the object identification module(s) 186 can be configured to compare a distribution of temperatures, as determined by the temperature determination module(s) 182, to object identification data 126, such as temperature patterns.

The object identification module(s) 186 can identify a detected object if there is a match between the determined temperature profile of the detected object and the object identification data 126. “Match” or “matches” means that the determined temperature profile of the detected object and an entry in the object identification data 126 are substantially identical. For instance, the determined temperature profile of the detected object and an entry in the object identification data 126 can match within a predetermined probability (e.g., at least about 85%, at least about 90%, at least about 95% or greater) or confidence level.

The anti-pinch window system 100 can include one or more window anti-pinch modules 188. The window anti-pinch module(s) 188 can be configured to control movement of the window 200. More particularly, the window anti-pinch module(s) 188 can be configured to control movement of the window 200 when an object is located within the window opening. Still more particularly, the window anti-pinch module(s) 188 can be configured to control movement of the window 200 when an object is located within the window opening and the window 200 is being closed.

The window anti-pinch module(s) 188 can be configured to control movement of the window 200 in any suitable manner. For instance, the window anti-pinch module(s) 188 can be configured to send control signals (e.g., commands) to the window 200. The control signals can be to stop movement, reverse movement, and/or to disable movement of the window 200.

In some arrangements, the window anti-pinch module(s) 188 can be configured to present a warning or an alert and/or to cause a warning or an alert to be presented. For instance, the window anti-pinch module(s) 188 can cause a warning or an alert to be presented on the window 200, the output interface(s) 150, and/or the dual-sided transparent display(s) 160. In one or more arrangements, the window anti-pinch module(s) 188 can cause a warning or alert to be presented on an inner facing side of the window 200. The warning or alert can apprise a vehicle occupant of a danger posed by the closing of the window 200. Alternatively or additionally, the window anti-pinch module(s) 188 can cause a warning or alert to be presented to a driver of the vehicle.

Now that the various potential systems, devices, elements and/or components of the anti-pinch window system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
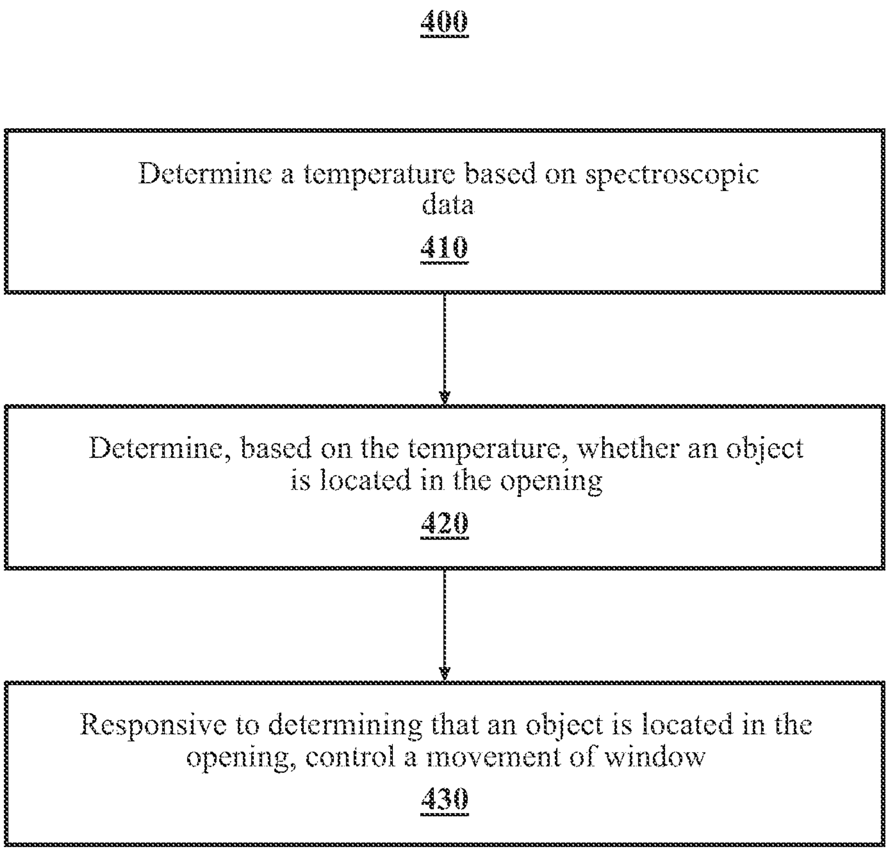
FIG. 4 is an example of an anti-pinch method for a window.

Turning to FIG. 4, an example of a method 400 for anti-pinching in a structure including window is shown. The structure can define an opening. The window can be operatively positioned within the opening. The window can be movable to selectively open and close the opening. The window can include an optical grating operatively positioned near a closing edge of the window. A light source can be configured to emit light toward the optical grating. A detector can be operatively positioned to acquire spectroscopic data of the light emitted from the light source after the light has interacted with the optical grating.

At block 410, the method 400 can include determining a temperature based on the spectroscopic data. The temperature can be determined by the temperature determination module(s) 182 and/or the processor(s) 110. For instance, the temperature determination module(s) 182 and/or the processor(s) 110 can compare the spectroscopic data to the wavelength-temperature dependence data 124. The method 400 can continue to block 420.

At block 420, the method 400 can include determining, based on the temperature, whether an object is located in the opening. Such a determination can be made by object detection module(s) 184 and/or the processor(s) 110. For instance, object detection module(s) 184 and/or the processor(s) 110 can compare the determined temperature to determine whether an object is location in the opening. The method 400 can continue to block 430.

At block 430, the method 400 can include, responsive to determining that an object is located in the opening, controlling a movement of window. Such controlling can be performed by the window anti-pinch module(s) 188 and/or the processor(s) 110. For instance, the window anti-pinch module(s) 188 and/or the processor(s) 110 can send signals to the window 200 to cause a movement of the window 200 to be controlled. As an example, movement of the window 200 can be stopped or reversed.

After block 430, the method 400 can end. Alternatively, the method 400 can return to block 410, or the method 400 can proceed to some other block. The method 400 can be performed continuously, periodically, irregularly, randomly, or responsive to a condition, event, or input. For instance, the method 400 can be initiated when a window close command is received or when window closure is detected. The method 400 can include additional and/or alternative steps to those describe above.

Figure 5:
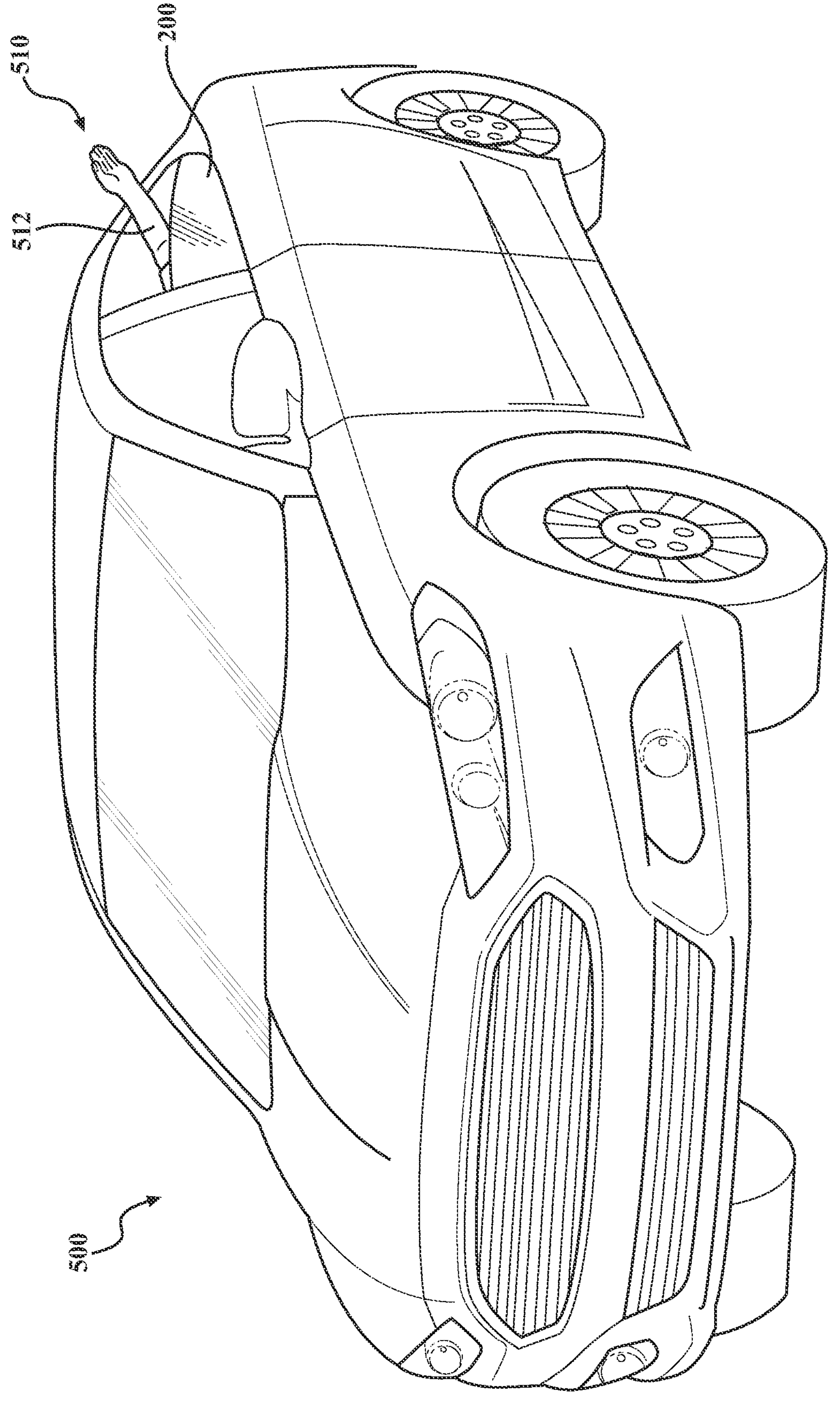
FIG. 5 is an example of a vehicle including the anti-pinch window system, showing an arm of a vehicle occupant extending through an open window.

A non-limiting example of the operation of the arrangements described herein will now be presented. FIG. 5 is an example of a vehicle 500 including the anti-pinch window system 100. The vehicle 500 can include one or more of the windows 200 as described above. In this example, the window 200 can be a rear driver's side window of the vehicle 500. The window 200 can be open. An arm 512 of a vehicle occupant 510 can extend through the window opening.

Figure 6:
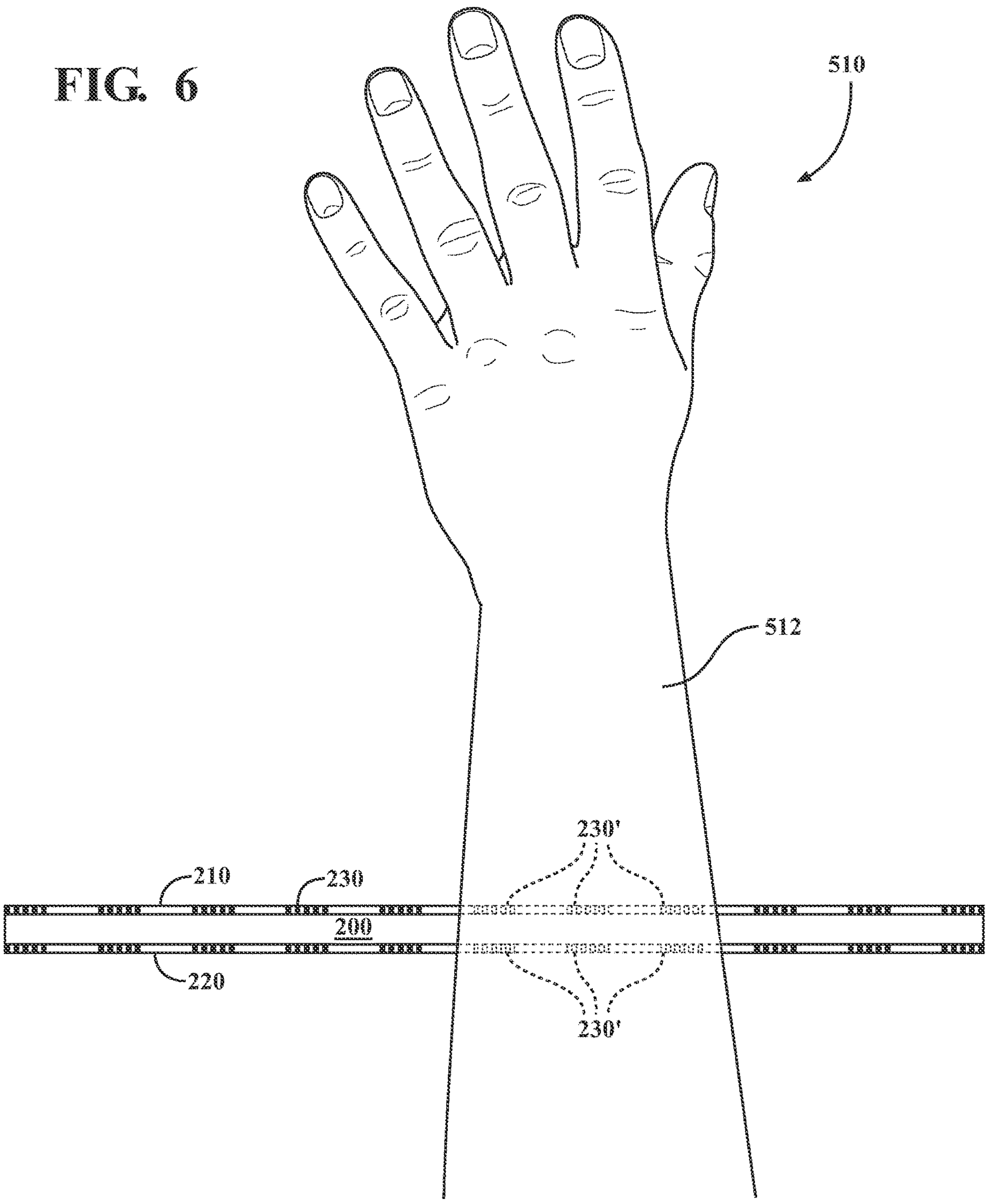
FIG. 6 is another view of the arm of the vehicle occupant extending though the open window.

FIG. 6 is another view of the arm 512 of the vehicle occupant 510 extending though the open window. When the input is received to close the window 200 or at any other time, the anti-pinch window system 100 can be activated to acquire the spectroscopic data. In this example, the optical gratings 230 can be located in substantial alignment on both sides of the window 200. In some arrangements, the optical gratings 230 can be located along a leading edge of the window 200. Using the acquired spectroscopic data, a temperature can be determined. The temperature can be determined by the temperature determination module(s) 182 and/or the processor(s) 110. For instance, the temperature determination module(s) 182 and/or the processor(s) 110 can compare the spectroscopic data to the wavelength-temperature dependence data 124. It will be appreciated that the presence of the arm 512 of the vehicle occupant 510 can affect the acquired spectroscopic data in the locations near the arm due to the heat energy of the arm 512.

Based on the temperature, it can be determined whether an object is located in the opening. Such a determination can be made by object detection module(s) 184 and/or the processor(s) 110. For instance, object detection module(s) 184 and/or the processor(s) 110 can use the determined temperature to determine whether an object is location in the opening. Such a determination can be made in any suitable manner. As an example, the determined temperature can be compared to one or more object temperature profiles, which can be a temperature range for particular objects. If the temperature falls within the range, then it can be determined to be an object of concern. As another example, the temperature can be compared to an ambient temperature or an expected temperature. When the temperature differs from the ambient temperature or the expected temperature, then an object is determined to be located in the opening.

In response to determining that an object is located in the opening, a movement of window can be controlled. Such controlling can be performed by the window anti-pinch module(s) 188 and/or the processor(s) 110. For instance, the window anti-pinch module(s) 188 and/or the processor(s) 110 can send signals to the window 200 to cause a movement of the window 200 to be controlled. As an example, movement of the window 200 can be stopped or reversed.

In some arrangements, responsive to determining that an object is located in the opening, cause a warning to be presented. For instance, the warning or message can indicate that the window is closing and request that the user clear the opening. The warning can be presented to the vehicle occupant 510 or to some other occupant (e.g., the driver). For instance, a warning or message can be presented on the window 502 to the vehicle occupant 510.

Figure 7:
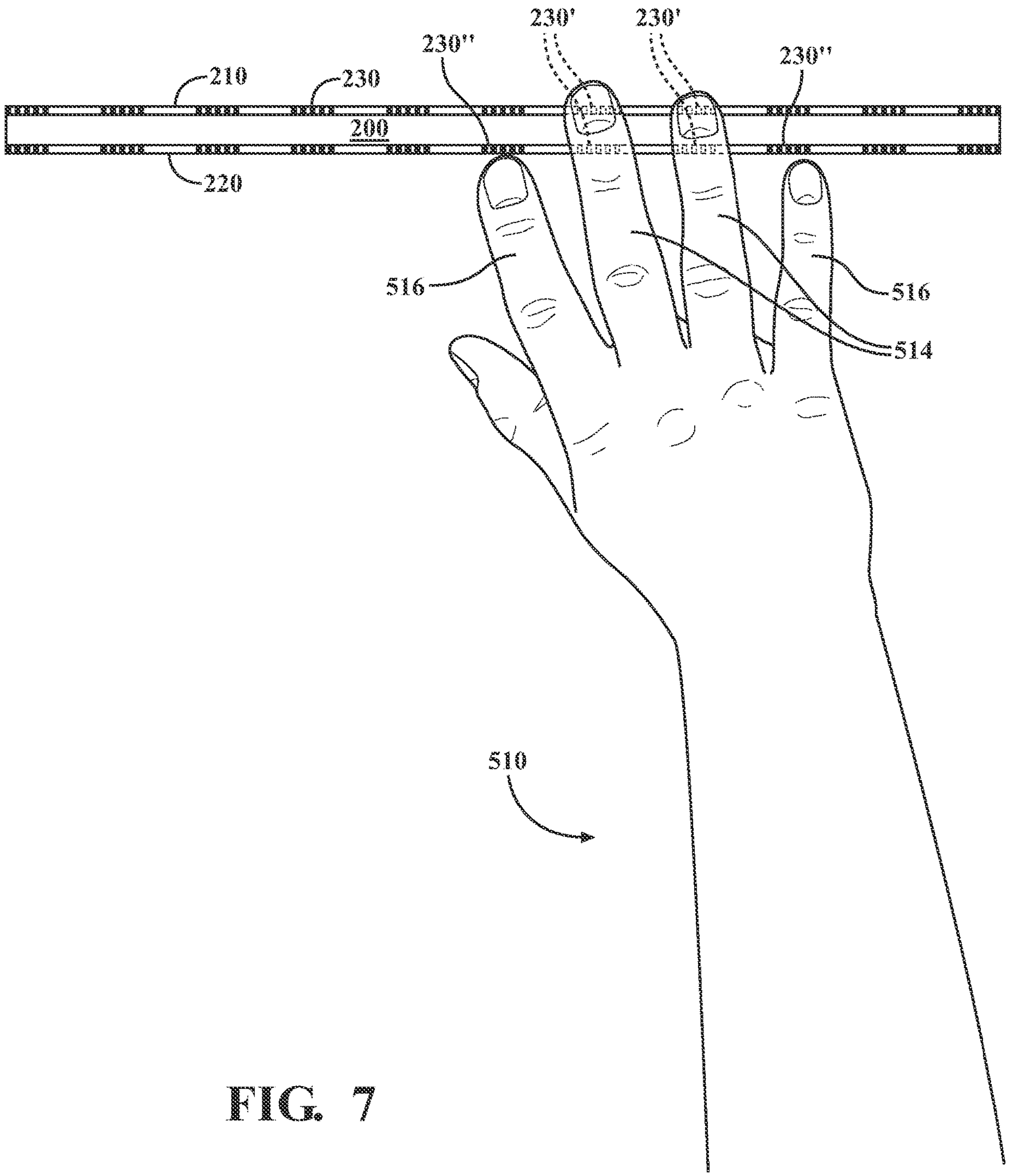
FIG. 7 is an example of a vehicle including the anti-pinch window system, showing fingers of a vehicle occupant extending through an open window.

FIG. 7 is an example of a vehicle including the anti-pinch window system 100. In this example, showing one or more fingers of the vehicle occupant 510 can extend through a window opening. In this example, two fingers 514 can extend through the window opening. Further, two fingers 516 can be located on the second side 220 of the window 200.

The detector(s) 250 (see FIGS. 2A and 2B) can acquire spectroscopic data at the optical grating(s) 230 on the first side 210 and the second side 220 of the window. Using the acquired spectroscopic data, a temperature at each of the optical gratings 230 can be determined. The temperature can be determined by the temperature determination module(s) 182 and/or the processor(s) 110. For instance, the temperature determination module(s) 182 and/or the processor(s) 110 can compare the spectroscopic data to the wavelength-temperature dependence data 124. The temperature determination module(s) 182 can also use the light source data 122 for determining changes in wavelength based on the original light signal from the light source(s) 240.

Based on the determined temperatures, it can be determined whether an object is located in the opening. Such a determination can be made by object detection module(s) 184 and/or the processor(s) 110. Such a determination can be made in any suitable manner. As an example, the determined temperature can be compared to object identification data 126, such as one or more object temperature ranges or thresholds. If the temperature falls within the range or meets a threshold, then it can be determined that an object is located in the opening. As another example, the determined temperature can be compared to an ambient temperature or an expected temperature. When the temperature differs from the ambient temperature or the expected temperature, then an object is determined to be located in the opening.

In some arrangements, the determining whether an object is located in the opening includes comparing the determined temperatures of aligned optical gratings on the first side 210 and the second side 220 of the window. Here, the aligned optical gratings 230' can show substantially the same elevated temperatures. The determined temperature of the first side 210 and the determined temperature of the second side 220 can be substantially the same and/or can differ from the ambient temperature or the expected temperature. In such case, an object can be determined to be located in the opening. In contrast, the two fingers 516 that are located only on the second side 220 of the window would not result in a determination that an object is located in the opening. Indeed, in this area, only the optical gratings 230" on the second side 220 of the window would differ from the ambient temperature or the expected temperature. The aligned optical gratings on the first side 210 of the window would not differ from the ambient temperature or the expected temperature. Alternatively or additionally, the determined temperature of the first side 210 and the determined temperature of the second side 220 would not be substantially the same. As a result of such differences, the anti-pinch window system 100 would not determine that an object is located in the opening.

In response to determining that an object is located in the opening, a movement of window can be controlled. Such controlling can be performed by the window anti-pinch module(s) 188 and/or the processor(s) 110. For instance, the window anti-pinch module(s) 188 and/or the processor(s) 110 can send signals to the window 200 to cause a movement of the window 200 to be controlled. As an example, the closing movement of the window 200 can be stopped or reversed. In some arrangements, responsive to determining that an object is located in the opening, the window anti-pinch module(s) 188 and/or the processor(s) 110 can cause warning to be presented. The warning or message can be presented on the window 502 to the vehicle occupant 510. For instance, the warning or message can indicate that the window is closing and request that the user clear the opening. Alternatively or additionally, the warning can be presented to the vehicle driver on the output interface(s) 150.

Arrangements are described herein in some instances in connection with a vehicle. However, it will be appreciated that arrangements described herein are not intended to be limited to vehicles. Indeed, arrangements described herein can be used in connection with any structure or device that includes a window that can be opened and closed. For instances, arrangements described herein can be used in connection with buildings, houses, or other structures.

Referring now to FIGS. 8-11, three embodiments of the dual-sided transparent display 160 are shown. In some arrangements, the dual-sided transparent display 160 can be a dual-sided transparent display panel. The embodiments described below overcome three significant shortcomings of conventional dual-sided display panels, which are described below.

First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein can provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

Figure 8:
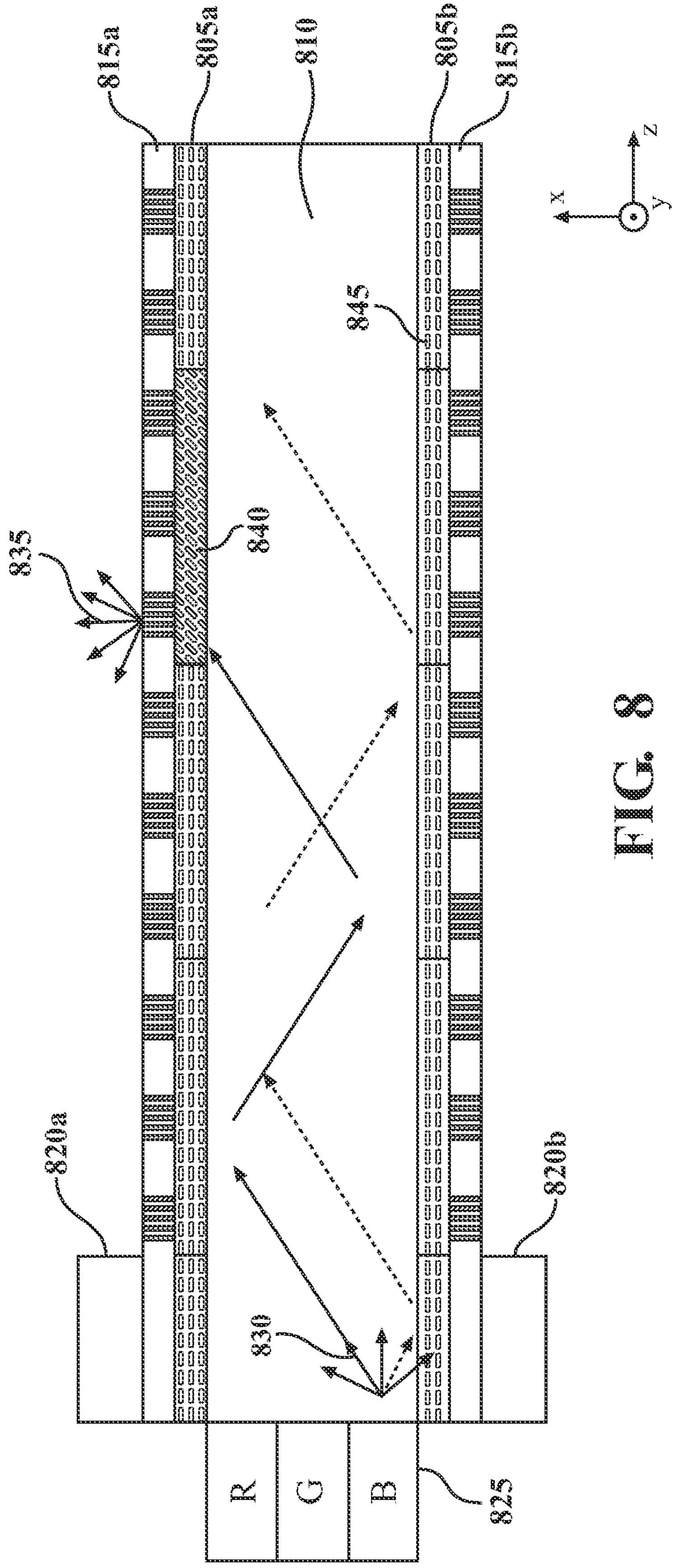
FIG. 8 is an example of a first embodiment of a dual-sided transparent display that can be used in connection with the anti-pinch window system.

FIG. 8 is a cross-sectional diagram a first embodiment of a dual-sided transparent display panel 160. This embodiment includes a first layer of electro-optic material 800*a* and a second layer of electro-optic material 800*b*, each of which has an inner surface (the surface closest to the axis of symmetry of the waveguide 810) and an outer surface (the surface farthest from the axis of symmetry just mentioned). As shown in FIG. 8, waveguide 810 is disposed between the inner surface of the first layer of electro-optic material 800*a* and the inner surface of the second layer of electro-optic material 800*b*. In some embodiments, waveguide 810 is made of glass.

Dual-sided transparent display panel 160 also includes a first grating coating 815*a* adjacent to the outer surface of the first layer of electro-optic material 800*a* and a second grating coating 815*b* adjacent to the outer surface of the second layer of electro-optic material 800*b*. In one embodiment, the first and second grating coatings (815*a* and 815*b*) are periodic grating coatings that include alternating diffusive and plain-glass regions.

Dual-sided transparent display panel 160 also includes light sources 825 along an edge of waveguide 810 that is perpendicular to the inner and outer surfaces of the first and second layers of electro-optic material (800*a* and 800*b*). In this embodiment, the light sources include red, green, and blue light sources in accordance with the RGB standard. In some embodiments, the light sources 825 are lasers. In other embodiments, the light sources 825 are light-emitting diodes (LEDs). In one embodiment, the LEDs are Micro-LEDs. In the coordinate system shown in FIG. 8, the light sources 825 are disposed along an edge of waveguide 810 that runs in the y direction (into and out of the page) and faces the negative z direction. In the embodiment shown in FIG. 8, dual-sided transparent display panel 160 is thus edge-lighted by light sources 825.

As diagramed in FIG. 8, light emitted from light sources 825 propagates along waveguide 810 in the z direction. In this embodiment, the first layer of electro-optic material 800*a* and the second layer of electro-optic material 800*b* can be, for example, an active liquid-crystal matrix or, in a different embodiment, a passive liquid-crystal matrix. In one embodiment, the first and second layers of electro-optic material (800*a* and 800*b*) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 8), the molecules of a liquid-crystal matrix can be caused to orient themselves in an "off" state or an "on" state. In FIG. 8, the vertical lines in first layer of electro-optic material 800*a* and second layer of electro-optic material 800*b* delineate the boundaries of rows or columns of pixels (in the y direction) in dual-sided transparent display panel 160.

Refer to the legend in FIG. 8 for the "on" and "off" states. Pixels with molecules oriented in the "off" (reflective) state 845 cause light such as the blue light 830 to be totally internally reflected within waveguide 810. The concept of total internal reflection (TIR) is well known in the waveguide-related art. As shown in FIG. 8, the oblong-shaped molecules oriented in the "off" state (845) are oriented substantially parallel to the z-axis (parallel to the direction in which light propagates within waveguide 810). Thus, a viewer looking at one of the sides of the dual-sided transparent display panel 160 in the positive or negative x direction would not see the blue light 830 at those pixel positions. Pixels with molecules oriented in the "on" (transmissive) state 840, on the other hand, are oriented at an angle relative to the z-axis, permitting light to exit waveguide 810, the blue light 830 mentioned earlier being diffused by first grating coating 815*a* to produce diffused and emitted blue light 835 that is visible to a user looking at dual-sided transparent display panel 160 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 160 (the side facing the positive x direction and the side facing the negative x direction) to permit different images to be displayed on the two opposite sides of dual-sided transparent display panel 160 simultaneously.

As shown in FIG. 8, dual-sided transparent display panel 160 also includes first light-blocking element 820*a* and second light-blocking element 820*b*. These light-blocking elements prevent light from leaking in the x direction from a predetermined portion (e.g., a rectangular strip) of dual-sided transparent display panel 160 adjacent to the edge of waveguide 810 (the perpendicular edge mentioned above) along which light sources 825 edge-light the display panel. In other words, the light-blocking elements 820*a* and 820*b* block light that is not totally internally reflected near the edge of the waveguide 810 closest to the light sources 825. In variations of the first embodiment (the embodiment shown in FIG. 8), a different type of electro-optic material other than a liquid-crystal matrix can be used.

Figure 9A:
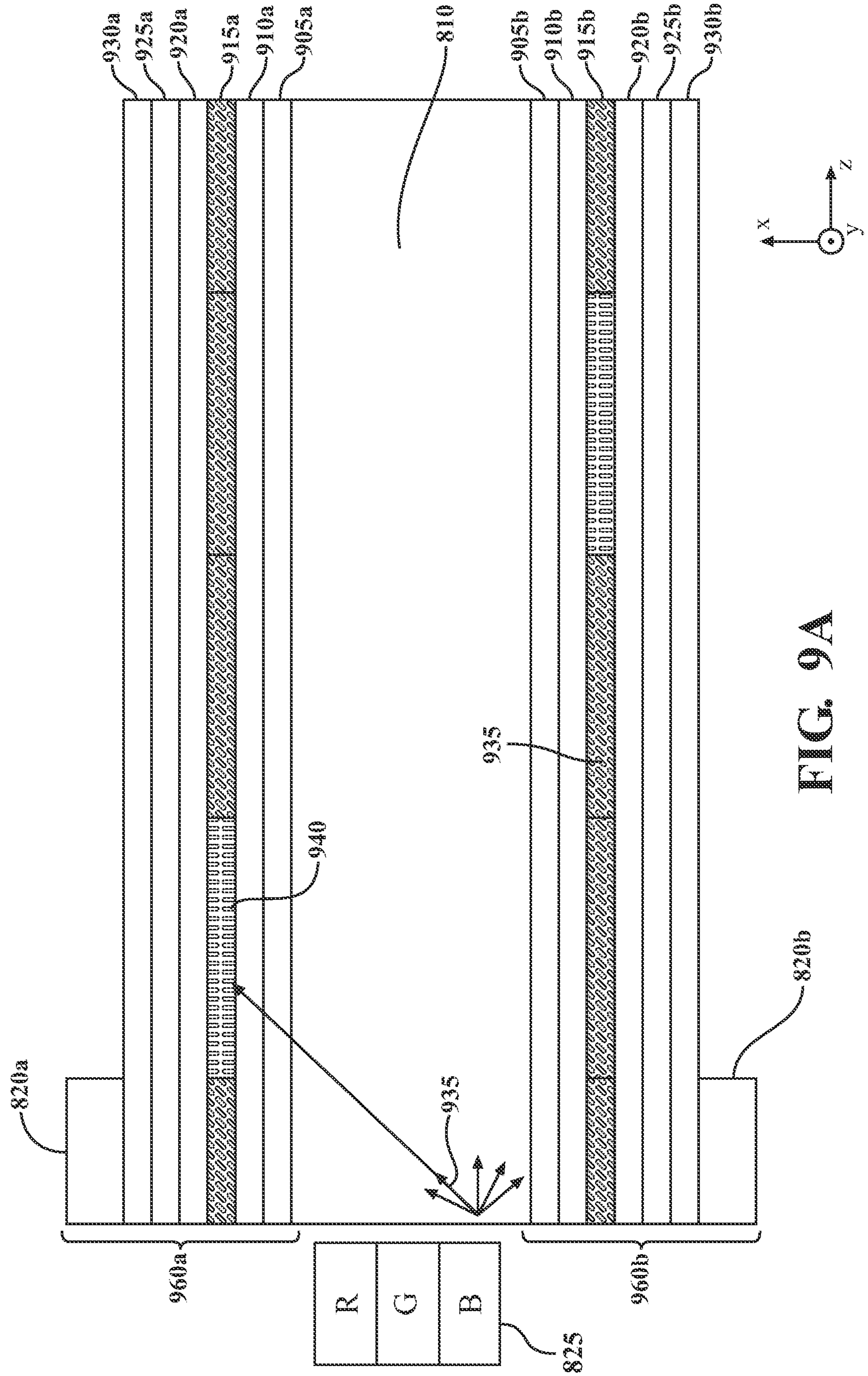
FIGS. 9A and 9B are an example of a second embodiment of a dual-sided transparent display that can be used in connection with the anti-pinch window system.

FIG. 9A is a cross-sectional diagram of a second embodiment of a dual-sided transparent display panel 160 in an illustrative molecular configuration of the liquid-crystal matrices. In this embodiment, the first and second grating coatings 815*a* and 815*b* in the embodiment of FIG. 8 are omitted, and other layers are added to each side of the overall display panel. In this embodiment, the liquid-crystal matrices themselves are capable of scattering/diffusing light, eliminating the need for the grating coatings.

The two sides of dual-sided transparent display panel 160 may be thought of as separate panel subassemblies. A first panel subassembly 960*a* of dual-sided transparent display panel 160 includes a plurality of adjacent layers. Those layers, moving from the innermost layer to the outermost layer (relative to the axis of symmetry of waveguide 910) include a first electrode layer 905*a*, a first polyimide layer 810*a*, a liquid-crystal matrix 915*a*, a second polyimide layer 920*a*, a second electrode layer 925*a*, and a glass layer 930*a*. The polyimide layers (910*a* and 920*a*) are used to place the liquid-crystal molecules in the desired orientation, when they are in their passive (default) state. The specific orientations of the molecules are discussed in greater detail below. In some embodiments, the electrode layers (905*a*, 925*a*) include Indium Tin Oxide (ITO).

A second panel subassembly 960*b* of dual-sided transparent display panel 160 includes a plurality of adjacent layers that correspond to those in the first panel subassembly 960*a*. Those layers, moving from the innermost layer to the outermost layer (relative to the axis of symmetry of waveguide 910), include a first electrode layer 905*b*, a first polyimide layer 910*b*; a liquid-crystal matrix 915*b*; a second polyimide layer 920*b*; a second electrode layer 925*b*, and a glass layer 930*b*. As mentioned above, in some embodiments, the electrode layers (905*b*, 925*b*) include Indium Tin Oxide (ITO).

In this embodiment, a waveguide 910 is disposed between the inner surface of the first electrode layer 905*a* of the first panel subassembly 960*a* and the inner surface of the first electrode layer 905*b* of the second panel subassembly 960*b*. In some embodiments, waveguide 910 is made of glass, as in the embodiment shown in FIG. 8.

Dual-sided transparent display panel 160 also includes light sources 925 along an edge of waveguide 810 that is perpendicular to the inner surface of the first electrode layer 905*a* of the first panel subassembly 960*a* and the inner surface of the first electrode layer 905*b* of the second panel subassembly 960*b*. In this embodiment, the light sources include RGB light sources. In some embodiments, the light sources 825 are lasers. In other embodiments, the light sources 825 are light-emitting diodes (LEDs). In the coordinate system shown in FIG. 9A, the light sources 825 are disposed along an edge of waveguide 810 that runs in the y direction (into and out of the page) and faces the negative z direction. In the embodiment shown in FIG. 9A, dual-sided transparent display panel 160 is thus edge-lighted by light sources 825.

In some embodiments, the liquid-crystal matrix in each of the panel subassemblies (960*a* and 960*b*) includes nematic liquid crystals. Refer to the legend for the "on" and "off" states in FIG. 9A. As depicted in FIG. 9A, the oblong-shaped molecules making up the nematic liquid crystals can be oriented at an angle (less than 90 degrees) relative to the positive z-axis, when in the passive or "off" state (see molecules oriented in the "off" state 945 in FIG. 9A). When the oblong-shaped molecules are in the "on" state, they are aligned approximately perpendicularly to waveguide 810 (see molecules oriented in the "on" state 940 in FIG. 9A). In the illustrative configuration of the molecules depicted in FIG. 9A, blue light 935 reaches a pixel for which the molecules are in the "on" state (940), which permits the blue light 935 to exit the first panel subassembly 960*a* in the positive x direction, making it visible to a user gazing toward dual-sided transparent display panel 160 in the negative x direction.

As shown in FIG. 9A, dual-sided transparent display panel 160 also includes first light-blocking element 820*a* and second light-blocking element 820*b*. These light-blocking elements prevent light from leaking in the x direction from a predetermined portion (e.g., a rectangular strip) of dual-sided transparent display panel 160 adjacent to the edge of waveguide 810 that is perpendicular to the inner surface of the first electrode layer 905*a* of the first panel subassembly 960*a* and the inner surface of the first electrode layer 905*b* of the second panel subassembly 960*b*— the edge of waveguide 810 along which light sources 825 edge-light the display panel. In other words, the light-blocking elements

820*a* and 820*b* block light that is not totally internally reflected near the edge of the waveguide 810 closest to the light sources 825.

Figure 9B:
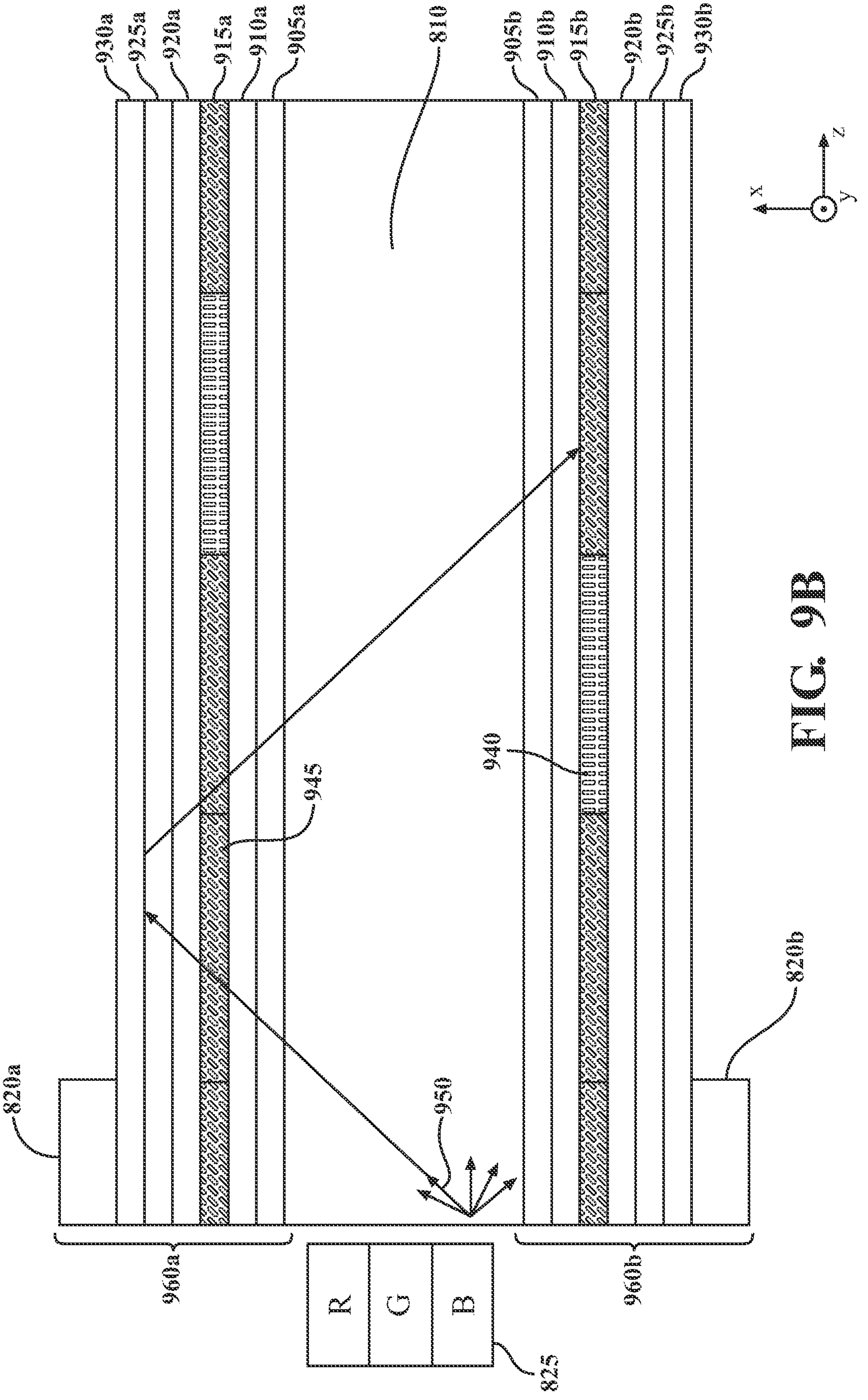

FIG. 9B is a cross-sectional diagram of a second embodiment of a dual-sided transparent display panel 160 in another illustrative molecular configuration of the liquid-crystal matrices. Refer to the legend for the "on" and "off" states in FIG. 9B. In this example, green light 950 encounters molecules in the liquid-crystal matrix 915*a* of the first panel subassembly 960*a* that are oriented in the "off" state (see molecules oriented in "off" state 945 in FIG. 9B). The orientation of those molecules (945) permits the green light 950 to propagate beyond liquid-crystal matrix 915*a* but causes the green light 950 to nevertheless be reflected within first panel subassembly 960*a* as if the dimensions of waveguide 810 were effectively expanded to encompass, e.g., the glass layer 930*a* of first panel subassembly 960*a*, as depicted in FIG. 9B. Thus, the molecules in a given panel subassembly (960*a* or 960*b*) that are oriented in the "off" state cause light from light sources 825 to be reflected by that panel subassembly toward the waveguide 810 instead of exiting that panel subassembly.

Figure 10A:
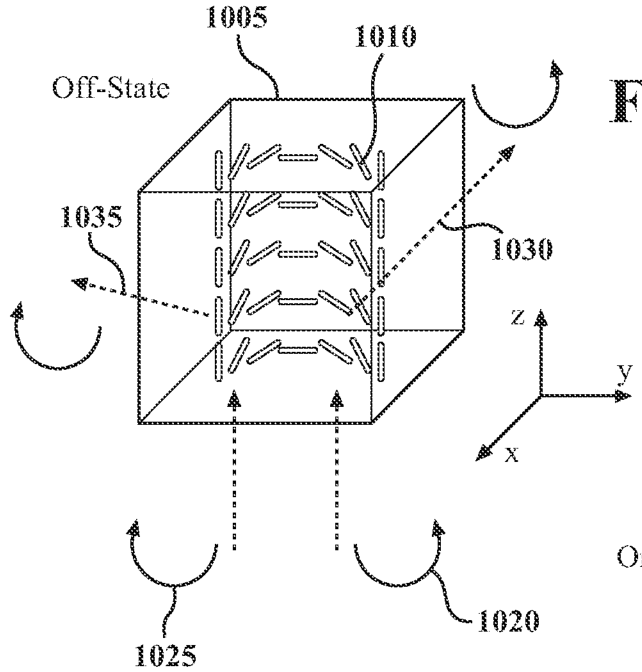
FIGS. 10A and 10B are various aspects of a third embodiment of a dual-sided transparent display that can be used in connection with the anti-pinch window system.

Before discussing a third embodiment of a dual-sided transparent display panel shown in FIG. 11, FIGS. 10A and 10B will be discussed to introduce some of the important principles underlying the embodiment in FIG. 11. FIG. 10A is a diagram of beam splitting using circular polarization when the molecules of a liquid-crystal substance are oriented in an "off" state, in connection with a third embodiment of a dual-sided transparent display panel. In FIG. 10A, light with two opposite circular polarizations, counterclockwise-polarized light 1020 and clockwise-polarized light 1025, enters a nematic liquid-crystal substance 1005. In FIG. 10A, the molecules 1010 are oriented in the "off" state. This causes the counterclockwise-polarized light 1020 to be diverted in the negative x direction (directed light 1030) and the clockwise-polarized light 1025 to be diverted in the opposite (positive x) direction (directed light 1035). With the molecules in this "off" configuration and the incoming light being polarized in opposite senses (clockwise and counterclockwise or right-handed and left-handed, respectively), the nematic liquid-crystal substance 1005 effectively acts as a beam splitter to direct light toward the separate sides of a dual-sided transparent display panel, depending on how the incoming light is polarized. In other words, an arrangement such as that shown in FIG. 10A exploits the chirality (or handedness) of the liquid-crystal molecules' effect on circularly polarized light, when the molecules are oriented in the "off" state.

Figure 10B:
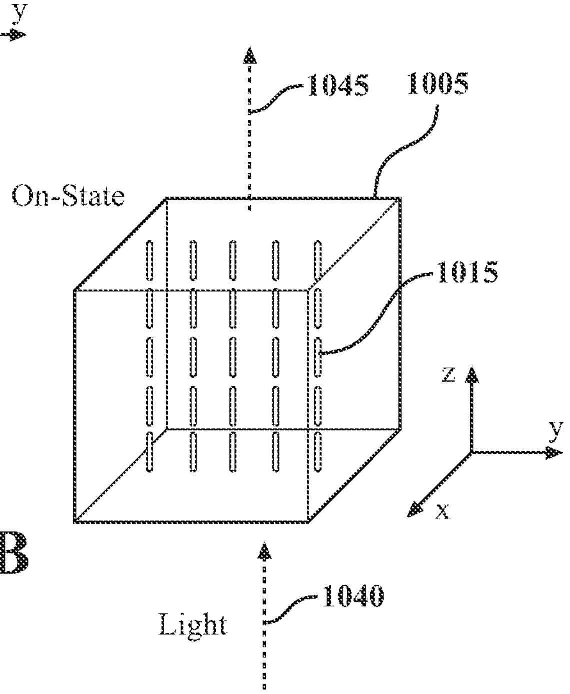

FIG. 10B is a diagram of light passing through a liquid-crystal substance when the molecules are in an orientation corresponding to an "on" state, in connection with a third embodiment of a dual-sided transparent display panel. As shown in FIG. 10B, entering light 1040 passes through nematic liquid-crystal substance 1005 (see exiting light 1045 in FIG. 10B) without being diverted by molecules 1015 that are oriented in the "on" state. Such light will not be visible to a user looking at either side of the dual-sided transparent display panel.

Figure 11:
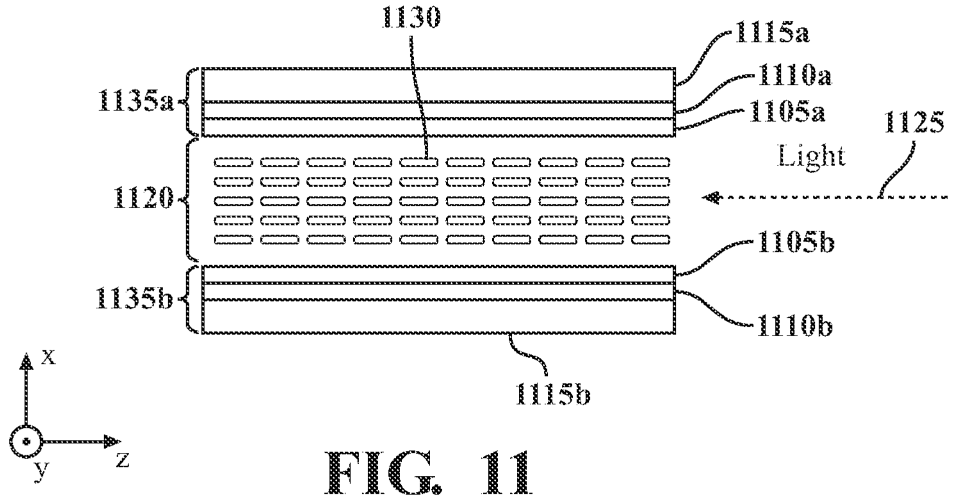
FIG. 11 is an example of the third embodiment of a dual-sided transparent display that can be used in connection with the anti-pinch window system.

FIG. 11 is a cross-sectional diagram of a third embodiment of a dual-sided transparent display panel 160. A first panel subassembly 1135*a* of dual-sided transparent display panel 160 includes a plurality of adjacent layers. Those layers, moving from the innermost layer to the outermost layer (relative to the axis of symmetry of a nematic liquid-crystal layer 1120 that acts as a waveguide) include a polyimide alignment layer 1105*a*, an electrode layer 1110*a*, and a glass layer 1115*a*.

A second panel subassembly 1135*b* of dual-sided transparent display panel 160 includes a plurality of layers that correspond to those in first panel subassembly 1135*a*. Those layers, moving from the innermost layer to the outermost layer (relative to the axis of symmetry of nematic liquid-crystal layer 1120) include a polyimide alignment layer 1105*b*, an electrode layer 1110*b*, and a glass layer 1115*b*. In some embodiments, the electrode layers (1110*a* and 1110*b*) in the two panel subassemblies include Indium Tin Oxide (ITO).

As shown in FIG. 10, nematic liquid-crystal layer 1120 is disposed between the inner surface of the polyimide alignment layer 1105*a* of the first panel subassembly 1135*a* and the inner surface of the polyimide alignment layer 1105*b* of the second panel subassembly 1135*b*. In a different embodiment, cholesteric liquid crystals are used instead of nematic liquid crystals. As discussed above, this layer acts as a waveguide with reorientable molecules within it (refer to the discussion of FIGS. 10A and 10B above) that direct, toward the glass layer 1115*a* of the first panel subassembly 1135*a*, light 1125 from one or more light sources that is circularly polarized in a first sense and that direct, toward the glass layer 1115*b* of the second panel subassembly, light 1125 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 11, the light sources for edge-lighting of the dual-sided transparent display panel can be similar, in this embodiment, to those discussed above in connection with FIGS. 8, 9A, and 9B (the first and second embodiments). In some variations of the embodiment shown in FIG. 11, a different type of liquid-crystal layer other than a nematic liquid-crystal layer can be employed.

In the embodiment shown in FIG. 11, the nematic liquid-crystal layer 1120 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 1120 from one or more light sources, such as the light sources 825 shown in FIGS. 8, 9A, and 9B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 825. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Further, it will be appreciated that the above-described embodiments of the dual-sided transparent display are not the only configurations that can be used. Indeed, additional examples of the dual-sided transparent display can include any of those disclosed in U.S. patent application Ser. No. 16/897,577, which is incorporated herein by reference in its entirety.

It will be appreciated that arrangements described herein can provide numerous benefits, including one or more of the benefits mentioned herein. For example, arrangements described herein can detect one or more objects located in the closing path of a window. Arrangements described herein can notify a user that the window could cause damage to the vehicle (or other structure) and/or injury to the person. Arrangements described herein can alter the movement of the window (e.g., stop or reverse) before any damage or injury occurs. Arrangements described herein can improve safety in any vehicle or structure that includes a window.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system, comprising:

a structure defining an opening;

a window operatively positioned within the opening, the window being movable to selectively open and close the opening, the window including an optical grating operatively positioned near a closing edge of the window;

a light source configured to emit light toward the optical grating;

a detector operatively positioned to acquire spectroscopic data of the light emitted from the light source after the light has interacted with the optical grating; and a processor operatively connected to the detector, wherein the processor is configured to:

determine a temperature based on the spectroscopic data;

determine, based on the temperature, whether an object is located in the opening; and responsive to determining that an object is located in the opening, control a movement of window.

2. The window of claim 1, wherein the optical grating is a Bragg grating, the Bragg grating having a coefficient of thermal expansion, whereby thermal expansion or contraction of the Bragg grating causes a change in the spectroscopic data of the light that has interacted with the Bragg grating.

3. The system of claim 1, wherein the structure is a vehicle.

4. The system of claim 1, wherein control a movement of window includes at least one of:

stopping the movement of the window; and reversing the movement of the window.

5. The system of claim 1, wherein determine, based on the temperature, whether an object is located in the opening includes:

comparing the temperature to an ambient temperature or an expected temperature; and when the temperature differs from the ambient temperature or the expected temperature, then an object is determined to be located in the opening.

6. The system of claim 1, wherein determine a temperature based on the spectroscopic data is performed when the window is being closed.

7. The system of claim 1, wherein the processor is further configured to:

responsive to determining that an object is located in the opening, causing a warning to be presented.

8. The system of claim 1, wherein the window includes a first side and a second side, wherein the first side is opposite the second side, and wherein the optical grating is operatively positioned with respect to the first side.

9. The system of claim 8, wherein the optical grating is a first optical grating, wherein the light source is a first light source, wherein the detector is a first detector, wherein the temperature is a first temperature, wherein the window includes a second optical grating operatively positioned with respect to the second side and near the closing edge of the window, and further including:

a second light source configured to emit light toward the second optical grating; and a second detector operatively positioned to acquire second spectroscopic data of the light emitted from the second light source after the light has interacted with the second optical grating, wherein the processor is further configured to determine a second temperature based on the second spectroscopic data.

10. The system of claim 9, wherein the first optical grating is substantially aligned with the second optical grating.

11. The system of claim 9, wherein determine, based on the temperature, whether an object is located in the opening includes:

comparing the first temperature and the second temperature to an ambient temperature or an expected temperature; and when the first temperature and the second temperature differ from the ambient temperature or the expected temperature, then an object is determined to be located in the opening.

12. The system of claim 11, further including:

comparing the first temperature and the second temperature, wherein comparing the first temperature and the second temperature to an ambient temperature or an expected temperature is performed when the first temperature and the second temperature are substantially the same.

13. The system of claim 1, wherein the optical grating is a plurality of optical gratings, wherein the plurality of optical gratings are positioned near the closing edge of the window, wherein the plurality of optical gratings are distributed along the closing edge of the window, wherein the light source is a plurality of light sources configured to emit light toward a respective one of the plurality of optical gratings, wherein the detector is a plurality of detectors, and wherein the plurality of detectors are operatively positioned to acquire spectroscopic data of the light emitted from a respective one of the plurality of light sources after the light has interacted with one of the plurality of optical gratings, and wherein the processor is operatively connected to the plurality of detectors.

14. The system of claim 13, wherein a processor is configured to:

determine a plurality of temperatures based on the spectroscopic data received from each of the plurality of detectors;

determine, based on the plurality of temperatures, whether an object is located in the opening; and determine, based on the plurality of temperatures, a location of the object in the opening.

15. The system of claim 13, wherein the processor is further configured to:

determine a plurality of temperatures based on the spectroscopic data received from each of the plurality of detectors;

determine, based on the plurality of temperatures, whether an object is located in the opening; and determine a size of the object based on the plurality of temperatures.

16. The system of claim 15, wherein the processor is further configured to identify the object.

17. A method for a structure including a window, the structure defining an opening, the window being operatively positioned within the opening, the window being movable to selectively open and close the opening, the window including an optical grating operatively positioned near a closing edge of the window, a light source configured to emit light toward the optical grating, a detector operatively positioned to acquire spectroscopic data of the light emitted from the light source after the light has interacted with the optical grating, the method comprising:

determine a temperature based on the spectroscopic data;

determine, based on the temperature, whether an object is located in the opening; and responsive to determining that an object is located in the opening, control a movement of window.

18. The method of claim 17, wherein control a movement of window includes at least one of:

stopping the movement of the window; and reversing the movement of the window.

19. The method of claim 17, wherein determining, based on the temperature, whether an object is located in the opening includes:

comparing the temperature to an ambient temperature or an expected temperature; and when the temperature differs from the ambient temperature or the expected temperature, then an object is determined to be located in the opening.

20. The method of claim 17, wherein the optical grating is a Bragg grating, the Bragg grating having a coefficient of thermal expansion, whereby thermal expansion or contraction of the Bragg grating causes a change in the spectroscopic data of the light that has interacted with the Bragg grating.

* * * * *